US006456620B1

United States Patent
Wang et al.

(10) Patent No.: US 6,456,620 B1
(45) Date of Patent: Sep. 24, 2002

(54) METHOD AND APPARATUS FOR CONSTRUCTING A LATIN SQUARE MATRIX FOR NETWORK COMMUNICATION

(75) Inventors: Jianchao Wang, Cambridge, MA (US); Yuanyuan Yang, South Burlington, VT (US)

(73) Assignees: Verizon Laboratories Inc., Waltham, MA (US); The University of Vermont, Burlington, VT (US)

( * ) Notice: Subject to any disclaimer, the term of this patent is extended or adjusted under 35 U.S.C. 154(b) by 0 days.

(21) Appl. No.: 09/251,562

(22) Filed: Feb. 17, 1999

(51) Int. Cl.[7] .......................... H04L 12/28; H04L 12/56; G06F 15/00; G06F 15/76

(52) U.S. Cl. ..................... 370/388; 370/351; 370/390; 370/422; 370/418; 712/11; 712/18

(58) Field of Search ................................. 370/388, 390, 370/389, 351, 422, 408, 374, 413, 418; 395/325, 800, 200.02, 200.13, 200.15, 200.2, 428, 429; 712/11, 12, 18, 13

(56) References Cited

U.S. PATENT DOCUMENTS

| | | | | |
|---|---|---|---|---|
| 4,984,237 A | * | 1/1991 | Franaszek | 370/388 |
| 5,142,686 A | * | 8/1992 | Hecht et al. | 395/800 |
| 5,361,255 A | * | 11/1994 | Diaz et al. | 370/374 |
| 5,671,222 A | * | 9/1997 | Chen et al. | 370/388 |
| 5,689,500 A | * | 11/1997 | Chiussi et al. | 370/235 |
| 6,201,808 B1 | * | 3/2001 | Wang et al. | 370/390 |

OTHER PUBLICATIONS

J. Duato, et al., "*Interconnection Networks: An Engineering Approach*", Chapter 1 and 5, IEEE Computer Society Press, Los Alamitos, CA, 1997.

D.K. Panda, "Issues in Designing Efficient and Practical Algorithms for Collective Communication on Wormhole–Routed Systems," Proceedings of the 1995 ICPP Workshop on Challenges for Parallel Processing, pp. 8–15, 1995.

Y. Yang, et al., "Nonblocking Broadcast Switching Networks," IEEE Trans. Computers, vol. C–40, No. 9, pp. 1005–1015, 1991.

Y. Yang, et al., "Broadcast Ring Sandwich Networks," IEEE Trans. Computers, vol. C–44, No. 10, pp. 1169–1180, 1995.

Y. Yang, "A Class of Interconnection Networks for Multicasting," IEEE Trans. Computers, vol. C–47, No. 8, pp. 899–906, Aug., 1998.

Y. Yang, et al., "A New Self–Routing Multicast Network," Proceedings of the First Merged IEEE International Parallel Processing Symposium & Symposium on Parallel and Distributed Processing (IPPS/SPDP '98), Orlando, FL, pp. 351–357, Mar., 1998.

S.L. Johnsson, et al, "Optimum Broadcasting and Personalized Communication in Hypercubes," IEEE Trans. Computers, vol. C–38, No. 9, pp. 1249–1268, Sep., 1989.

(List continued on next page.)

*Primary Examiner*—Wellington Chin
*Assistant Examiner*—M. Phan
(74) *Attorney, Agent, or Firm*—Leonard Charles Suchyta; James K. Weixel

(57) ABSTRACT

Disclosed is a method for all-to-all personalized exchange for a class of multistage interconnecting networks (MINs). The method is based on a Latin square matrix corresponding to a set of admissible permutations of a multistage interconnecting network. Disclosed are first and second methods for constructing a Latin square matrix used in the personalized exchange technique. Also disclosed is a generic method for decomposing all-to-all personalized exchange patterns into admissible permutations to form the Latin square matrix for self-routing networks which are a subclass of the MINs.

30 Claims, 12 Drawing Sheets

OTHER PUBLICATIONS

D.S. Scott, "Efficient All–to–All Communication Patterns in Hypercube and Mesh Topologies," Proceedings of the $6^{th}$ Conference: Distributed Memory Concurrent Computers, pp. 398–403, 1991.

R. Thakur and A. Choudhary, "All–to–All Communication on Meshes with Wormhole Routing," Proceedings of $8^{th}$ IEEE International Parallel Processing Symposium, pp. 561–565, Apr., 1994.

Y. Saad, et al., "Data Communication in Parallel Architectures," Parallel Computing, vol. 11, pp. 131–150, 1989.

Y.–C. Tseng, et al., "All–to–All Personalized Communication in a Wormhole–Routes Torus," IEEE Trans. Parallel and Distributed Systems, vol. 7, No. 5, pp. 498–505, May, 1996.

Y.–C. Tseng, et al., "Bandwidth–Optimal Complete Exchange on Wormhole Routed 2D/3D Torus Networks: A Diagonal–Propagation Approach," IEEE Trans. Parallel and Distributed Systems, vol. 8, No. 4, pp. 380–396, Apr., 1997.

F. Petrini, "Total–Exchange on Wormhole K–ary n–cubes with Adaptive Routing," Proceedings of the First Merged IEEE International Parallel Processing Symposium & Symposium on Parallel and Distributed Processing, pp. 267–271, Orlando, FL, Mar., 1998.

Y.J. Suh, et al., "All–to–All Communication with Minimum Start–up Costs in 2D/3D Tori and Meshes," IEEE Trans. Parallel and Distributed Systems, vol. 9, No. 5, pp. 442–458, May, 1998.

Y.J. Suh, et al., "Efficient All–to–All Personalized Exchange in Multidimensional Torus Networks," Proceedings of 1998 International Conference on Parallel Processing, pp. 468–475, Aug. 1998.

D. Gannon, et al., "On the Impact of Communication Complexity in the Design of Parallel Numerical Algorithms," IEEE Trans. Computer, vol. C–33, pp. 1180–1194, Dec., 1984.

S.L. Johnsson, "Communication Efficient Basic Linear Algebra Computations on Hypercube Architectures," Journal of Parallel Distributed Computing, vol. 4, pp. 133–172, Apr., 1987.

C.–L. Wu, et al., "On a Class of Multistage Interconnection Networks," IEEE Trans. Computers, vol. C–29, No. 8, pp. 694–702, Aug., 1980.

C. Clos, "A Study of Non–Blocking Switching Networks," The Bell System Technical Journal, vol. 32, pp. 406–424, 1953.

V.E. Benes, "Heuristic Remarks and Mathematical Problems Regarding the Theory of Switching Systems," The Bell System Technical Journal, vol. 41, pp. 1201–1247, 1962.

L.R. Goke, et al., "Banyan Networks for Partitioning Multiprocessor Systems," Proceedings of the First Annual Symposium on Computer Architecture, 1973, pp. 21–28.

D. Nassimi, et al., "A Self–Routing Benes Network and Parallel Permutation Algorithms," IEEE Trans. Computers, vol. C–30, No. 5, pp. 332–340, May, 1981.

* cited by examiner

BASELINE NETWORK

OMEGA NETWORK

INDIRECT BINARY n-CUBE NETWORK

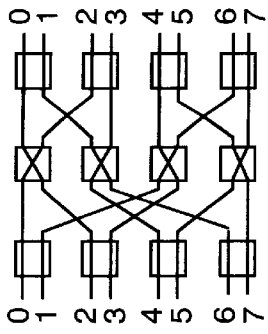
FIG. 10A III 04261537
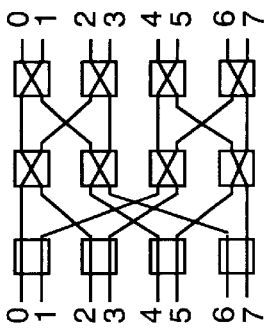
FIG. 10B II$\phi_1$ 15370426
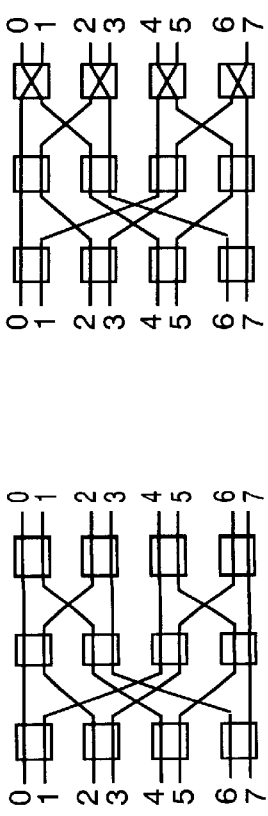
FIG. 10C I$\phi_1\phi_1$ 37152604
FIG. 10D I$\phi_1$I 26043715
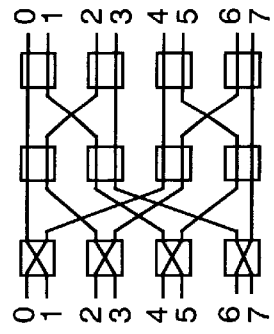
FIG. 10E $\phi_1\phi_1$I 62407351
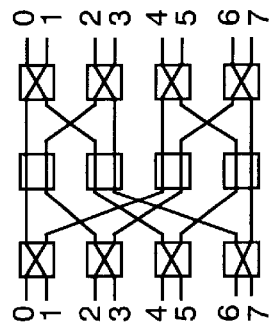
FIG. 10F $\phi_1\phi_1\phi_1$ 73516240
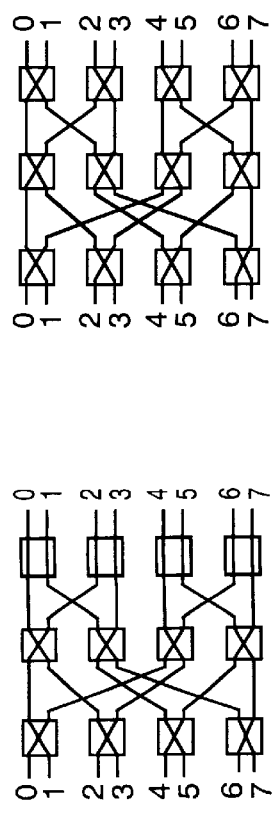
FIG. 10G $\phi_1$I$\phi_1$ 51734062
FIG. 10H $\phi_1$II 40625173

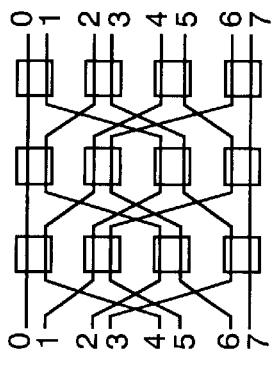
FIG. 11A III 01234567
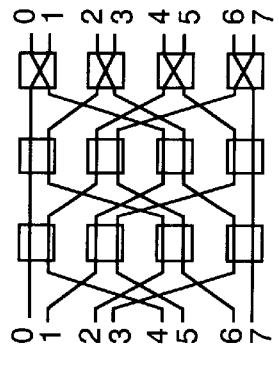
FIG. 11B II$\phi_1$ 10325476
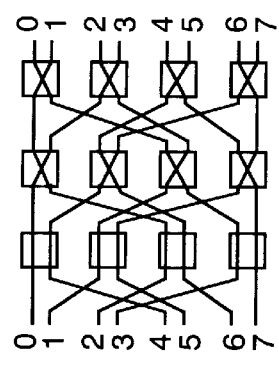
FIG. 11C I$\phi_1\phi_1$ 32107654
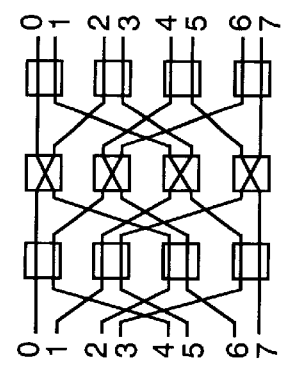
FIG. 11D I$\phi_1$I 23016745
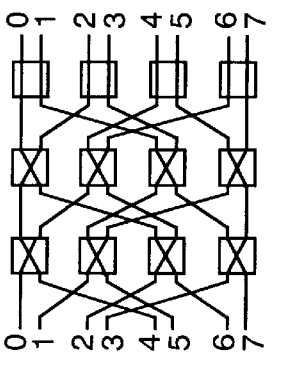
FIG. 11E $\phi_1\phi_1$I 67452301
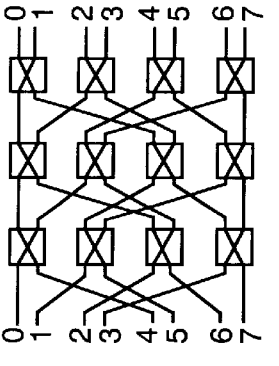
FIG. 11F $\phi_1\phi_1\phi_1$ 76543210
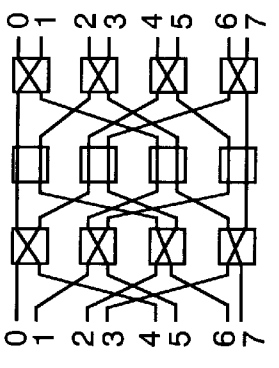
FIG. 11G $\phi_1$I$\phi_1$ 54761032
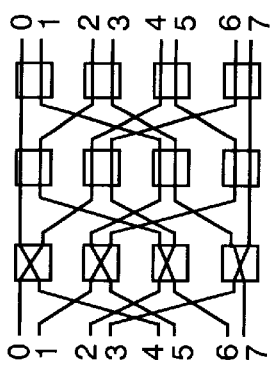
FIG. 11H $\phi_1$II 45670123

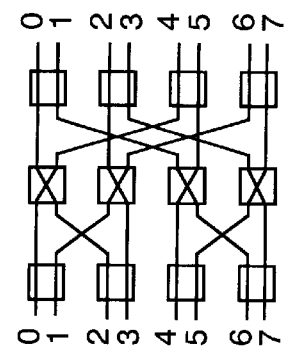
FIG. 12D  $I\phi_1I$  46025713
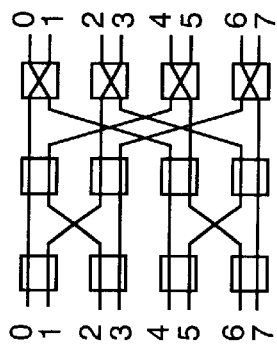
FIG. 12C  $I\phi_1\phi_1$  57134602
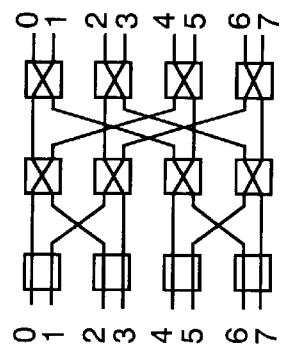
FIG. 12B  $II\phi_1$  13570246
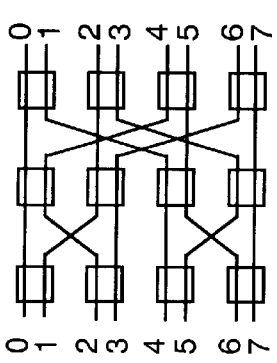
FIG. 12A  $III$  02461357
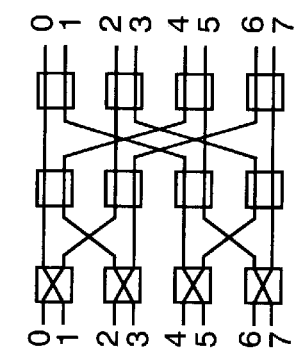
FIG. 12H  $\phi_1II$  20643175
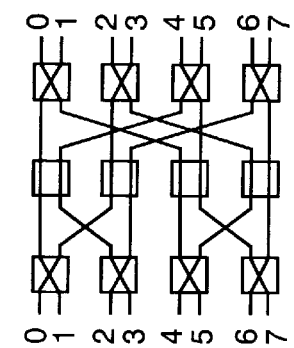
FIG. 12G  $\phi_1I\phi_1$  31752064
FIG. 12F  $\phi_1\phi_1I$  75316420
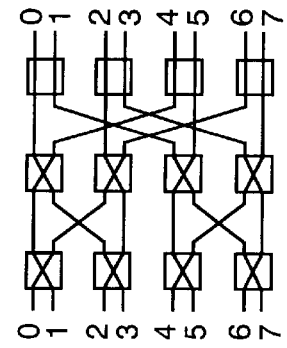
FIG. 12E  $\phi_1\phi_1II$  64207531

METHOD AND APPARATUS FOR CONSTRUCTING A LATIN SQUARE MATRIX FOR NETWORK COMMUNICATION

STATEMENT REGARDING FEDERALLY SPONSORED RESEARCH OR DEVELOPMENT

This invention was made with Government support under Grant No. DAAH 04-96-1-0234, awarded by th U.S. Army Research Office, and Grant No. OSR-935-0540, awarded by the National Science Foundation. The Government has certain rights in this invention.

BACKGROUND OF THE INVENTION

This application generally relates to networks, and more specifically to communications in a network.

Collective communication generally involves global data movement and global control among a group of nodes in a network. Many scientific applications exhibit the need of such collective communication patterns. For example, efficient support for collective communication may significantly reduce communication latency and simplify the programming of parallel computers. Collective communication has received much attention in telecommunication and parallel processing in recent years.

All-to-all communication is one type of collective communication. In all-to-all communication, every node in a group sends a message to each other node in the group. Depending on the nature of the message to be sent, all-to-all communication can be further classified as all-to-all broadcast and all-to-all personalized exchange. In all-to-all broadcast, every node sends the same message to all other nodes. In all-to all personalized exchange, every node sends a distinct message to every other node. All-to-all broadcast and all-to-all personalized exchange may be used in networking and parallel computational applications. For example, all-to-all broadcasting may be used in performing matrix multiplication, LU-factorization, and Householder transformations. All-to-all personalized exchange may be used, for example, in performing matrix transposition and fast Fourier transforms (FFTs).

Techniques for all-to-all personalized exchange have been considered in different types of networks. A first class of techniques is used in a high-dimensional network type, such as the hypercube. One drawback of using the first class of techniques in a high-dimensional network type is the poor scalability due to the unbounded node degrees of the high-dimensional network topology.

A second class of techniques have been developed for use in mesh and torus networks. These techniques have an advantage over the first techniques in that these network types have bounded node degrees and are more scalable. However, these second techniques used in the mesh and torus networks have a drawback in that long communications delays may be experienced in all-to-all personalized exchange due to the network topology.

Thus, there is required a technique for performing all-to-all personalized exchanges which is scalable while simultaneously seeking to minimize communication delays.

BRIEF DESCRIPTION OF THE DRAWINGS

The above-mentioned and other features of the invention will now become apparent by reference to the following description taken in connection with the accompanying drawings in which:

FIGS. 10A–10H are block diagrams of an embodiment of switch settings for an 8×8 baseline network;

FIGS. 11A–11H are block diagrams of an embodiment of switch settings for an 8×8 omega network; and FIGS. 12A–12H are block diagrams of an embodiment of switch settings in an 8×8 indirect binary n-cube network.

SUMMARY OF THE INVENTION

In accordance with one aspect of the invention, a method, system, and computer program product for constructing a Latin-square matrix are presented. Basic permutations are calculated. A permutation set is calculated using the basic permutations. A list of numbers $a_0, a_1, \ldots a_{n-1}$ is defined such that $\{a_0, a_1, \ldots a_{n-1}\} = \{0, 1, \ldots n-1\}$. Each entry of the Latin-square matrix is calculated as follows:

$$\begin{bmatrix} a_0 & a_1 & a_2 & \cdots & a_{n-1} \\ \rho_1(a_0) & \rho_1(a_1) & \rho_1(a_2) & \cdots & \rho_1(a_{n-1}) \\ \rho_2(a_0) & \rho_2(a_1) & \rho_2(a_2) & \cdots & \rho_2(a_{n-1}) \\ \vdots & \vdots & \vdots & \vdots & \vdots \\ \rho_{n-1}(a_0) & \rho_{n-1}(a_1) & \rho_{n-1}(a_2) & \cdots & \rho_{n-1}(a_{n-1}) \end{bmatrix}$$

In accordance with another aspect of the invention, a method, system, and computer program product for constructing a matrix in which no two entries in a row and a column are equivalent are presented. The matrix is an n-dimensional square matrix. A list of "n" elements is provided in which each element is a number. A list of basic permutations is built. Each basic permutation is a function providing a mapping of a first one of the elements to a second one of the elements. Given a first row of the matrix, successive rows of the matrix are built using the immediately prior row of the matrix and the functions defined by the basic permutations.

In accordance with yet another aspect of the invention, a method, system, and computer program product for constructing a Latin-square matrix for use in network communication is presented. The nodes communicate using a multistage interconnection network. A list of "n" elements is provided in which each element is a number. A list of basic permutations is built in which each basic permutation is a function providing a mapping of a first one of the elements to a second one of the elements. Given a first row of the matrix, successive rows of the matrix are built in which each row is produced using the immediately prior row of the matrix and the functions defined by the basic permutations.

The Latin square matrix constructed may be used in performing all-to-all communications in a multistage interconnection network. At particular times, distinct messages are sent between nodes of the network in accordance with the Latin square matrix.

Thus there is described a technique for use in performing all-to-all personalized exchanges which is scalable while simultaneously seeking to minimize communication delays.

DETAILED DESCRIPTION OF THE PREFERRED EMBODIMENT

Figure 1:
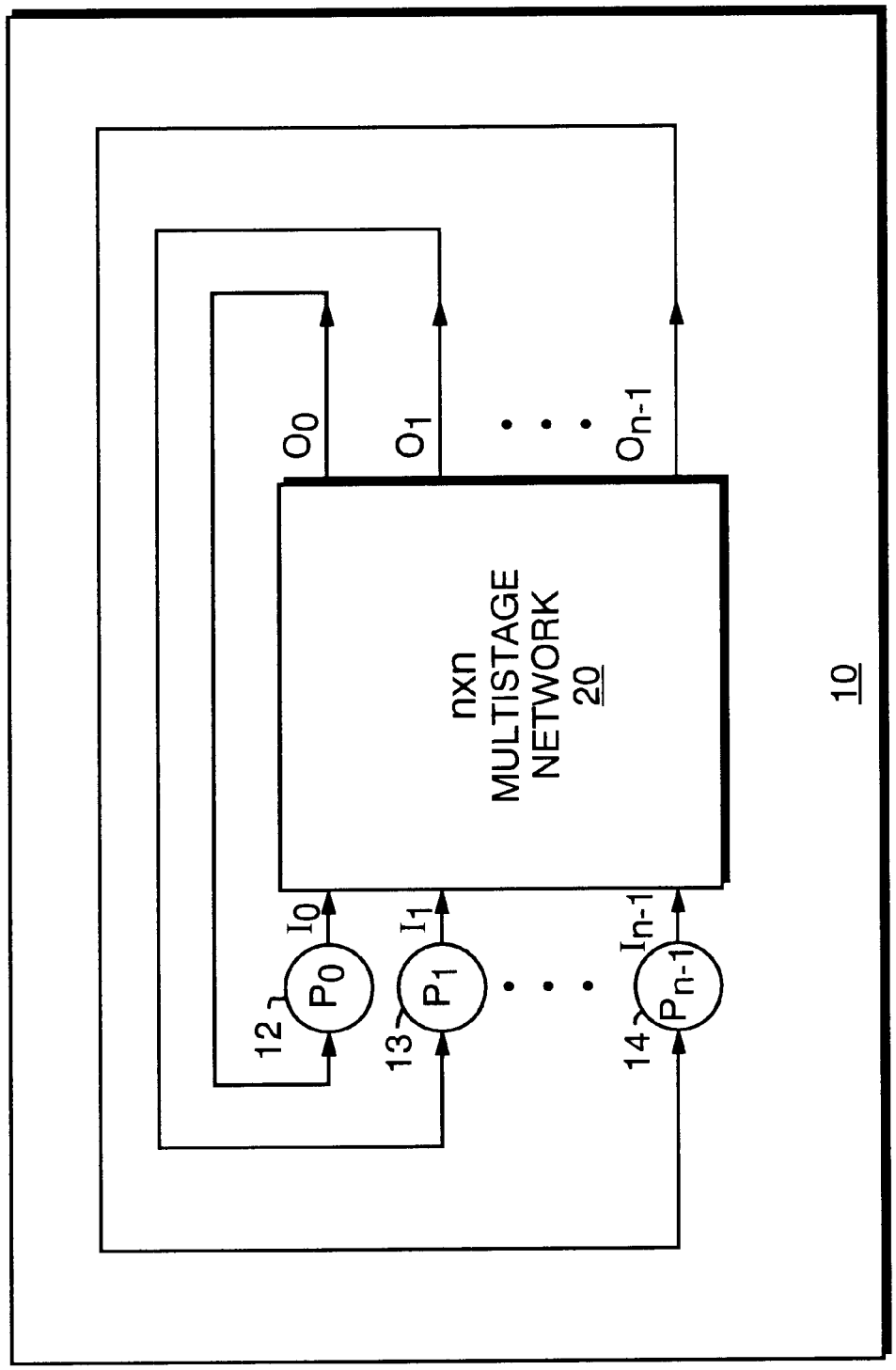
FIG. 1 is an embodiment of a computer system according to the present invention.

Referring now to FIG. 1, shown is an embodiment of a processor with nodes communicating using a multistage interconnection network (MIN) 20. Within this example of a computer system 10 shown are processor nodes $P_0$ through $P_{n-1}$ labeled 12–14. Conventional processors may be used in a preferred embodiment although the type of processor best suited for use may vary depending on particularities of a preferred embodiment and its application. These processor nodes communicate through the MIN 20. A processor node 12 provides an input $I_0$ into the MIN 20, and receives an output $O_0$ from the MIN 20. Similarly processor nodes $P_1$ through $P_{n-1}$ provide inputs and receive outputs from the MIN 20. Generally the MIN 20 is used for interprocess communication between nodes $P_0$ through $P_{n-1}$ as needed, for example, in performing parallel processing applications in the computer system 10.

Generally, the MIN 20 of computer system 10 can be chosen from a variety of networks, such as crossbar, Clos, Benes, baseline, omega, indirect binary n-cube. Although generally any MIN may be used for interprocess communication in a computer system 10 as depicted in FIG. 1, a preferred embodiment of the invention may also include those MIN networks which are members of a class of self-routing networks containing a unique path between each input/output pair in the network. Networks such as baseline, omega, and indirect binary n-cube, for example, are members of the class of self-routing networks. Other MIN network types such as the crossbar, Clos, and Benes network are not members of the self-routing network class. Although the crossbar and Clos network both can realize all possible permutations between network input and outputs, and have a constant communication latency, the network cost associated with the hardware of an n×n crossbar and a three-stage Clos network are $O(n^2)$ and $O(n^{3/2})$, respectively, which are generally considered too high for large systems, for example, such as computer system 10 with many processor nodes. A Benes network which has a network cost of $O(n \log n)$ may also realize all permutations, but not all permutations may be easily routed through the network and some rearrangements of existing connections may be needed. In addition, the Benes network may also be viewed as a concatanation of a baseline network and a reverse baseline network with the center stages overlapped. The Benes network typically has a network cost as well as the communication latency of approximately twice those of a baseline type of network.

The hardware for implementing the MIN 20 is straightforward to one skilled in the art given the description in text which follows. Generally, a MIN may include multistage switching elements.

Thus, a preferred embodiment of the invention may include any MIN network, or a specific type of MIN network, the self-routing network, such as a baseline, rather than non-self-routing networks, such as a Clos or Benes network. Although self-routing networks generally realize a proper subset of permutations of inputs and outputs, realization of a full permutation capability is not necessary in an all-to-all personalized exchange. It should be noted that the class of self-routing networks may prove to be a better choice in a particular preferred embodiment of the invention than non-self-routing networks.

In the paragraphs that follow, first presented is a generalized method for performing all-to-all communications using a MIN network. Subsequently, two methods for generating a Latin square matrix used in the generalized method of all-to-all communications are presented. A generic technique for generating Latin square matrices for use with self-routing networks is also disclosed. Generally, as will become apparent from the following descriptions, using a MIN facilitates interprocess communication over prior art approaches due to the shorter communication latency and better scalability.

It should generally be noted that the computer system 10 of FIG. 1 is only one embodiment of interprocess communication that may be used with the invention. Additionally, the processor 10 of FIG. 1 can include any number of nodes to facilitate any one of a variety of other uses such as, for example, parallel computing within the computer system 10.

Figure 2A:
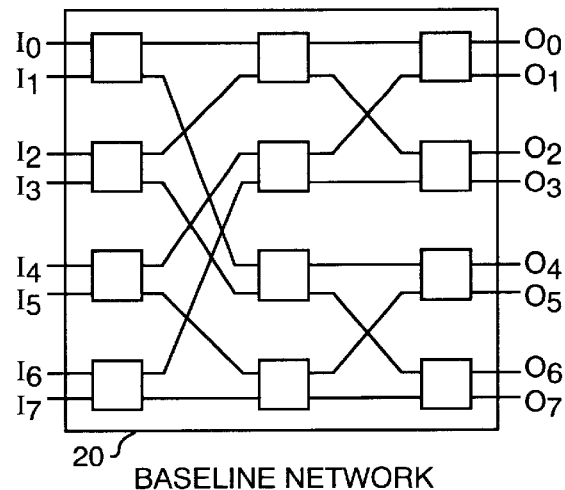
FIGS. 2A–2C are block diagrams of example types of multistage interconnection networks.
Figure 2B:
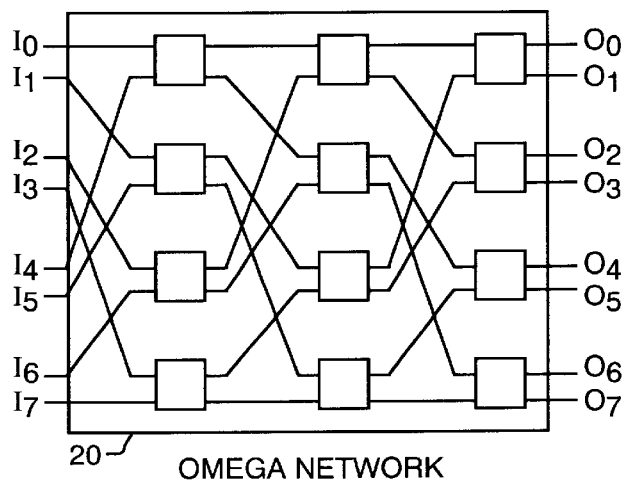
Figure 2C:
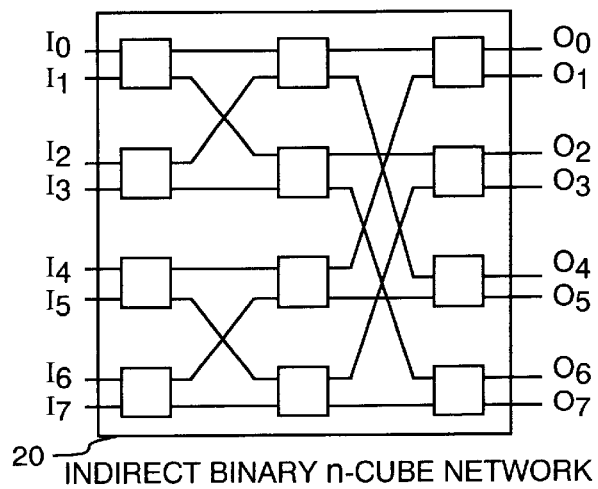

Shown in FIGS. 2A–2C are three types of multistage interconnection networks that may be used in a preferred embodiment of the MIN in the computer system 10 of FIG. 1. As known to those skilled in the art, FIG. 2A shows a baseline network, FIG. 2B shows an omega network, and FIG. 2C shows an indirect binary n-cube network. In the example shown in FIGS. 2A–2C, an 8×8 network is illustrated. In particular, the "8×8" refers to the number of inputs and outputs, respectively, in and out of the network. As known to those skilled in the art, a typical network structure for the class of MINs has "n" equal to "$_2$ m" inputs and outputs and to "log (n)=m" stages, with each stage consisting of $n/2$, 2×2 switches, and any two adjacent stages connected by n-interstage links.

A permutation is a one-to-one mapping between the network inputs and outputs, as in FIGS. 1 and 2A–2C. For an n×n network, suppose there is a one-to-one mapping $\rho$ which maps input $i$ to output $a_i$ (i.e. $\rho(i)=a_i$), where $a_i \in \{0, 1, \ldots, n-1\}$ for $0 \leq i \leq n-1$, and $a_i \neq a_j$ for $i \neq j$.

Let $$\rho = \begin{pmatrix} 0 & 1 & \cdots & n-1 \\ a_0 & a_1 & \cdots & a_{n-1} \end{pmatrix}$$

denote this permutation. In particular, when $\rho(i)=i$ for $0 \leq i \leq n-1$, this permutation is referred to as an identity permutation and denoted as I.

Some properties and notations of permutations which will be used in following paragraphs are now noted. Given two permutations $\rho_1$ and $\rho_2$, a composition $\rho_1\rho_2$ of the two permutations is also a permutation, which maps $i$ to $\rho_1(\rho_2(i))$. Clearly, $\rho_1 = I\rho = \rho$, but in general $\rho_1\rho_2 \neq \rho_2\rho_1$. However, the associative law does apply here. That is, $\rho_1(\rho_2\rho_3)=(\rho_1\rho_2)\rho_3$. Let $\rho^i$ denote the composition of $i$ permutations $\rho$'s. Also, if $\rho_1\rho_2=I$, $\rho_1$ is the inverse of $\rho_2$ and vice versa. This is denoted as $\rho_1=\rho_2^{-1}$ and $\rho_2=\rho_1^{-1}$. A permutation can also be expressed as a cycle or composition of several cycles. For example, in a 4×4 mapping, a cycle (0, 3, 2) represents a permutation in which 0, 3, and 2 are mapped to 3, 2, and 0, respectively, while 1 is kept unchanged. In addition, for representational convenience, the following notation is used to represent a mapping ρ(a)=b $$a \xrightarrow{\rho} b$$

In the context of a MIN, each stage in the network can be viewed as a shorter n×n network, and so does each set of interstage links. Let $\sigma_i (0 \leq i \leq m-1)$ denote the permutation represented by stage i, and $\pi_i (0 \leq i \leq m-2)$ denote the permutation represented by the set of interstage links between stage i and stage i+1. The permutation $\sigma_i$ is referred to as stage permutation, the permutation $\phi_i$ as an interstage permutation, and the permutation realized by the entire multistage interconnection network as an admissible permutation of the network. Clearly, an admissible permutation can be expressed by a composition of stage permutations and interstage permutations. For example, the admissible permutation of a baseline network can be expressed as $$\sigma_{m-1} \pi_{m-2} \ldots \pi_0 \sigma_0 \quad (1)$$

In general, interstage permutations $\pi_i$'s are fixed by the network topology. For a baseline network, suppose the binary representation of a number $a \in \{0, 1, \ldots, n-1\}$ is $P_{m-1} P_{m-2} \ldots P_1 P_0$. Then the permutation $\pi_i$ represents the following mapping:

$$p_{m-1} p_{m-2} \ldots p_1 p_0 \xrightarrow{\pi_i} p_{m-1} p_{m-2} \ldots p_{m-i} p_0 p_{m-i-1} \ldots p_2 p_1 \quad (2)$$

This mapping corresponds to a 1-bit circular-right-shift among the m−i least significant bits while keeping the i most significant bits unchanged.

However, stage permutation $\sigma_i$'s are not fixed since each switch can be set to either parallel or cross. Thus $\sigma_i$ can be a composition of any subset of cycles $\{(0, 1), (2, 3), \ldots, (n-1, n)\}$, which implies that there are a total of $2^{n/2}$ possible choices for each $\sigma_i$. It follows that by (1) the number of all admissible permutations of a baseline network is $(2^{n/2})^{\log n} = n^{n/2}$. This also holds for other networks with a similar structure, such as omega and indirect binary n-cube, shown in FIGS. 2B and 2C, respectively.

Figure 3:
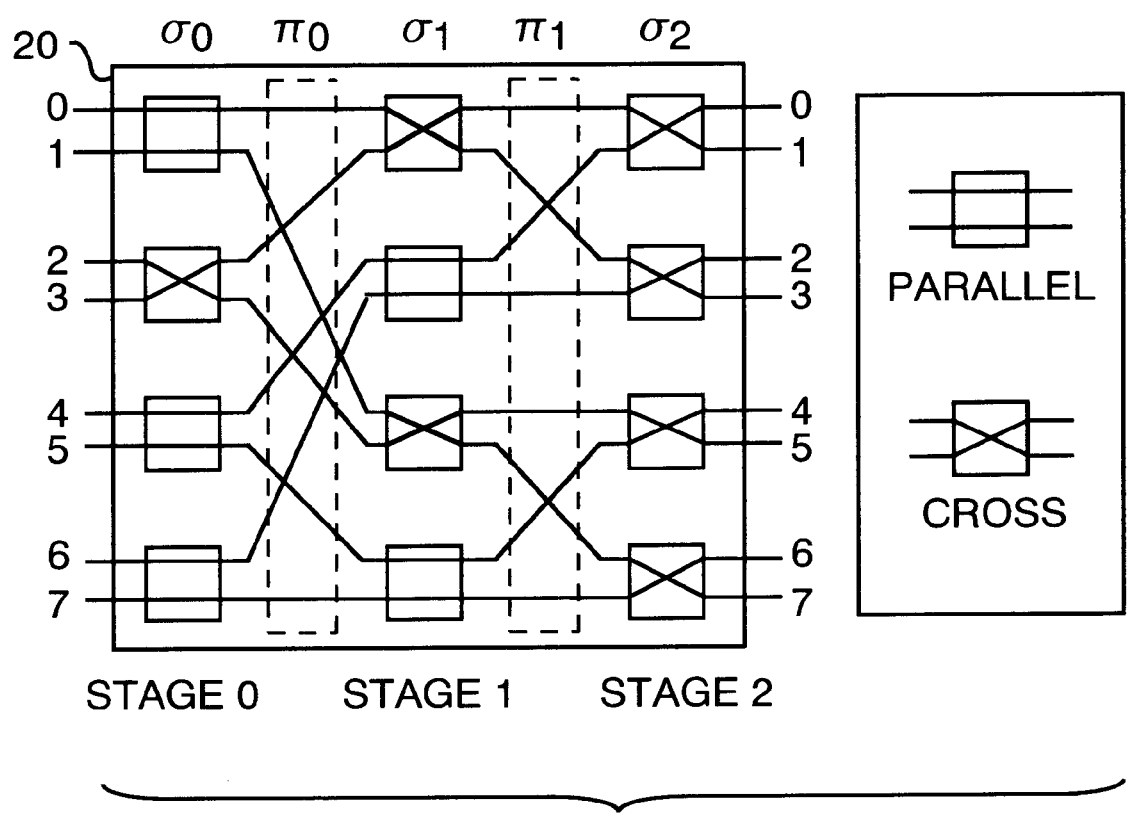
FIG. 3 is a block diagram of an embodiment of an 8×8 baseline network.

Referring now to FIG. 3, shown is a routing example of an 8×8 baseline network. Recall that FIG. 2A set forth an embodiment of an example baseline network, as used now in FIG. 3. In the MIN 20 of FIG. 3, there are stage permutations $\sigma_0 = (2, 3), \sigma_1 = (0, 1)(4, 5)$, and $\sigma_2 = (0, 1)(2, 3)(4, 5)(6, 7)$, and interstage permutations (in both binary and decimal).

$$\pi_0 = \begin{pmatrix} 000 & 001 & 010 & 011 & 100 & 101 & 110 & 111 \\ 000 & 100 & 001 & 101 & 010 & 110 & 011 & 111 \end{pmatrix} =$$

$$\begin{pmatrix} 0 & 1 & 2 & 3 & 4 & 5 & 6 & 7 \\ 0 & 4 & 1 & 5 & 2 & 6 & 3 & 7 \end{pmatrix}$$

$$\pi_1 = \begin{pmatrix} 000 & 001 & 010 & 011 & 100 & 101 & 110 & 111 \\ 000 & 010 & 001 & 011 & 100 & 110 & 101 & 111 \end{pmatrix} =$$

$$\begin{pmatrix} 0 & 1 & 2 & 3 & 4 & 5 & 6 & 7 \\ 0 & 2 & 1 & 3 & 4 & 6 & 5 & 7 \end{pmatrix}$$

For input 0, the following transformation is obtained:

$$0 \xrightarrow{\sigma_0} 0 \xrightarrow{\pi_0} 0 \xrightarrow{\sigma_1} 1 \xrightarrow{\pi_1} 2 \xrightarrow{\sigma_2} 3$$

that is, $$0 \xrightarrow{\sigma_2 \pi_1 \sigma_1 \pi_0 \sigma_0} 3$$

After computing the transformation for every input, the overall permutation obtained for the switch settings in the network is:

$$\sigma_2 \pi_1 \sigma_1 \pi_0 \sigma_0 = \begin{pmatrix} 0 & 1 & 2 & 3 & 4 & 5 & 6 & 7 \\ 3 & 7 & 5 & 1 & 0 & 4 & 2 & 6 \end{pmatrix}$$

An embodiment, as shown in FIG. 1, is used in all-to-all personalized exchange in a MIN of log-n stages. In following paragraphs, first discussed is the lower bound on the communication time for all-to-all personalized exchange in such a network, and then proposed is a technique for realizing all-to-all personalized exchange.

The following lemma concerns the lower bound on the maximum communication delay of all-to-all personalized exchange in a MIN.

Lemma 1 The maximum communication delay of all-to-all personalized exchange in an n×n network of log n stages is at least $\Omega(n + \log n)$.

Proof. The lemma holds because each processor must receive one message from all other n−1 processors, which takes $\Omega(n)$ time, and each message must go through log n stages from its source processor to its destination processor, which takes $\Omega(\log n)$ time.

A Latin square is defined as an n×n matrix $$\begin{bmatrix} a_{0,0} & a_{0,1} & \cdots & a_{0,n-1} \\ a_{1,0} & a_{1,1} & \cdots & a_{1,n-1} \\ \vdots & \vdots & & \vdots \\ a_{n-1,0} & a_{n-1,1} & \cdots & a_{n-1,n-1} \end{bmatrix}$$

in which the entries $a_{i,j}$ are numbers in $\{0, 1, 2, \ldots, n-1\}$ and no two entries in a row (or a column) have the same value. A Latin square may be described equivalently in a different way: for all i and j, $0 \leq j, 0 \leq i, j \leq n-1$, the entries of each row in the matrix, $a_{i,0}, a_{i,1}, \ldots, a_{i,n-1}$, form a permutation $$\begin{pmatrix} 0 & 1 & 2 & \cdots & n-1 \\ a_{i,0} & a_{i,1} & a_{i,2} & \cdots & a_{i,n-1} \end{pmatrix}$$

and the entries of each column in the matrix, $a_{0,j}, a_{1,j}, \ldots, a_{n-1,j}$, also form a permutation $$\begin{pmatrix} 0 & 1 & 2 & \cdots & n-1 \\ a_{0,j} & a_{1,j} & a_{2,j} & \cdots & a_{n-1,j} \end{pmatrix}$$

Two Latin squares are equivalent if one can be transformed into another by swapping rows of its matrix. This concept is useful when considering different approaches to constructing a Latin square.

Generally, for a MIN under consideration, there exists a Latin square such that any permutation formed by each row of the matrix is admissible to the network. An all-to-all personalized exchange method (ATAPE) may be designed which is generic for the class of multistage interconnection networks (MINs). For simplicity in describing this embodiment, it is assumed that every message has the same length so that the message transmission at each stage is synchronized. Although this is true for the embodiment described herein, other preferred embodiments may have messages of differing length. A higher-level description of the ATAPE method is given in Table I in following text with corresponding method steps in FIGS. 4A and 4B.

Figure 4A:
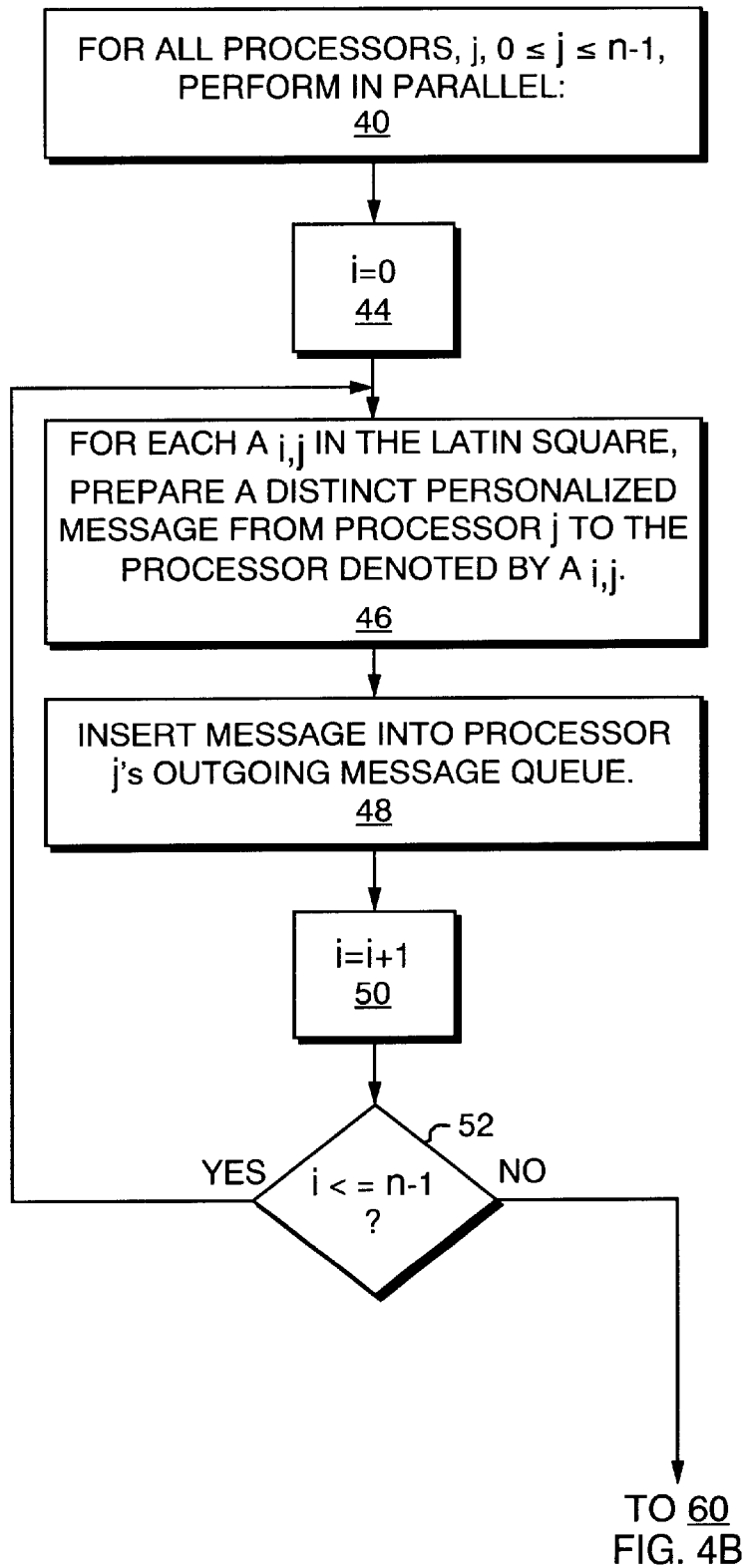
FIGS. 4A and 4B are flowcharts depicting method steps of an embodiment of performing an all-to-all personalized exchange method in a multistage interconnection network.
Figure 4B:
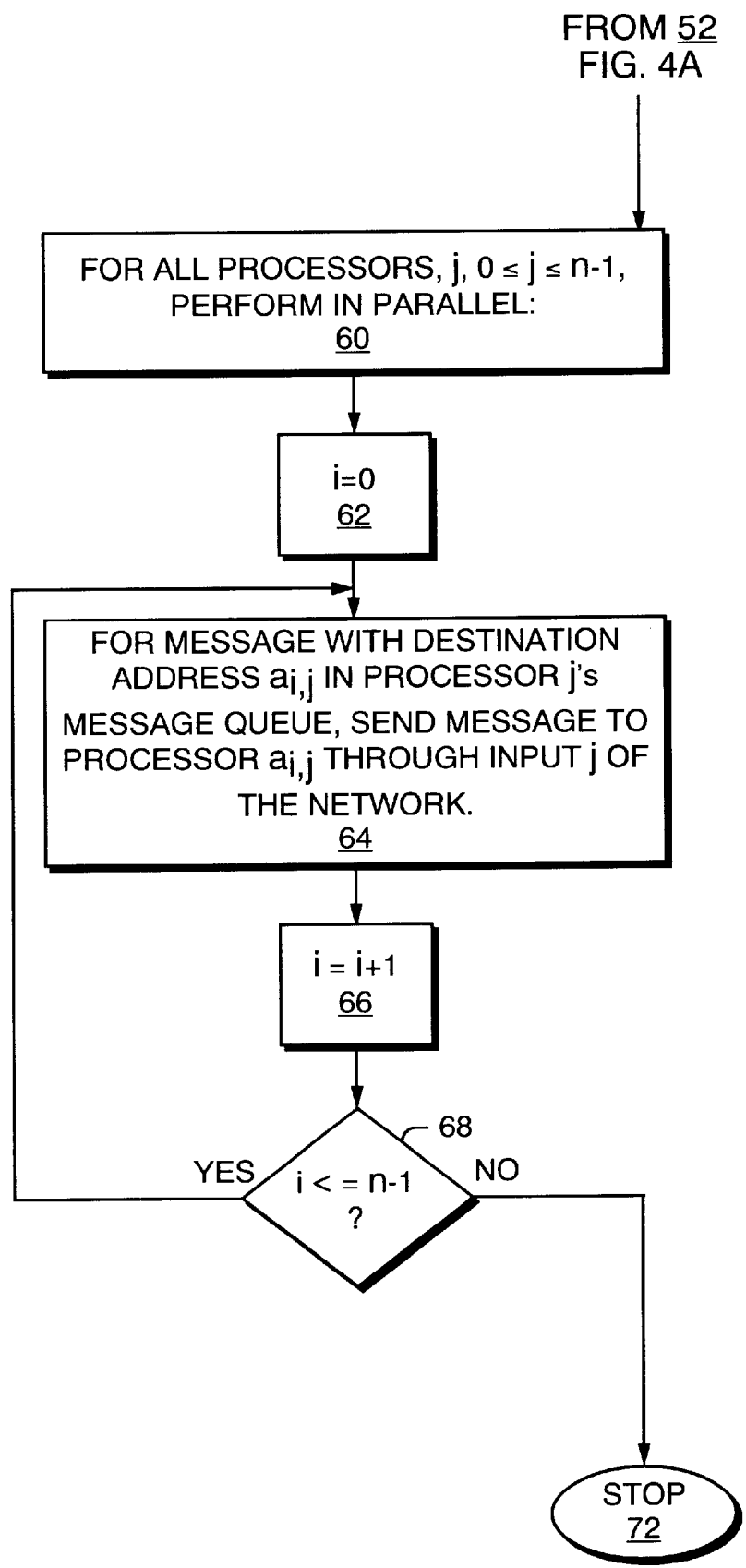

Referring now to FIGS. 4A and 4B, shown are example method steps for performing all-to-all personalized exchange within the class of MINs. Generally, as previously described, the all-to-all personalized exchange method is a method for sending distinct messages from each processor to each other processor, for example, as in the computer system 10 of FIG. 1. As indicated at step 40, method steps 44–52 are performed by each processor, in parallel, for all processors, j, $0 \leq j \leq n-1$. Control proceeds to step 44 where a loop control variable i is initialized to 0. After step 44, control proceeds to step 46 where, for each $a_{ij}$ in the Latin square matrix, a distinct personalized message is prepared to be sent from processor j to the processor denoted by the entry into the matrix $a_{ij}$. Control proceeds to step 48 where the message is inserted into processor j's outgoing message queue. Control proceeds to step 50 where the local variable i is incremented by 1. Control proceeds to step 52 where a determination is made as to whether or not i is less than or equal to n−1. If a determination is made at step 52 that i is less than or equal to n−1, control proceeds back to step 46 where steps 46, 48, and 50 are again repeated until i reaches the quantity n. Note that steps 44, and the loop formed by steps, 46, 48, 50 and 52 are performed in parallel by each processor.

If a determination is made at step 52 that i is not less than or equal to the quantity of n−1, to control proceeds to step 60 of FIG. 4B. As indicated at step 60, another set of steps, 62–68, are performed in parallel by each processor similar to those steps 44–52. At step 62, a local variable i is initialized to 0. At step 64, for the message with destination address $a_{i,j}$ in processor j's outgoing message queue, the message is sent to processor $a_{ij}$ through input j of the network. Subsequently, at step 66 the local variable i is incremented by 1. At step 68 a determination is made as to whether or not the quantity represented by i is less than or equal to the quantity of n−1. If a determination is made at step 68 that i is less than or equal to n−1, control proceeds to step 64. Steps 64 and 66 are repeated until the quantity represented by i is not less than or equal to n−1. When a determination is made at step 68 that i is not less than or equal to n−1, control proceeds to step 72 where the process depicted by FIGS. 4A and 4B terminates.

Table I: All-to-all personalized exchange method for a class of multistage interconnection networks

---

Method ATAPE
begin

---

Step 1. for each processor j ($0 \leq j \leq n - 1$) do in parallel
1.1 for each $a_{i,j}$ ($0 \leq i \leq n - 1$) in the Latin square do in sequential prepare a personalized message from processor j to processor $a_{i,j}$; insert the message into the message queue j;

---

Method ATAPE
begin

---

Step 2. for each processor j ($0 \leq j \leq n - 1$) do in parallel
2.1 for each message with destination address $a_{i,j}$ ($0 \leq j \leq n - 1$)
in the message queue j do in sequential
Send the message destined to $a_{i,j}$ through input j of the network;
end;

---

In the foregoing Table I, the method steps depicted by ATAPE are represented in previously described FIGS. 4A and 4B. Generally, in method ATAPE, processor j sends distinct messages to all destinations in the order of $a_{0,j}$, $a_{1,j}, \ldots, a_{n-1,j}$, which corresponds to the column j of the Latin square. Generally, for method ATAPE in time frame i, all n processors send their messages simultaneously to destinations $a_{i,0}, a_{i,1}, \ldots, a_{i,n-1}$, an which corresponds to the row i of the Latin square. In method ATAPE, all-to-all personalized exchange is achieved by realizing n permutations which correspond to the n rows of the Latin square, under the assumption that each permutation represented by a row of the Latin square is admissible to the network.

Note that, as previously described, a preferred embodiment may include a MIN which is self-routing. In this instance, the sequential steps of 2.1 may be performed in a pipelined fashion. This achieves a form of parallelism since two messages entering from two inputs of a switch may pass the switch simultaneously without any conflicts. Subsequently, once the previous n messages leave the switches of the current stage, the next n messages can enter the switches of this stage. Therefore, for self-routing networks, the time complexities of Step 1 and Step 2 are O(n) and O(n+log n), respectively. The total time delay for the all-to-all personalized exchange technique in self-routine networks is generally O(n+log n).

In the following text, described are methods for constructing the Latin square matrix as used in the all-to-all personalized exchange methods of FIGS. 4A and 4B previously described.

In following paragraphs, general terms and notation used throughout the application is described. Additionally, first and second methods for constructing a Latin square matrix, or Latin square, are set forth. It should be noted that although two methods are described herein, other methods known to those skilled in the art may also be used to construct a Latin square matrix that may be used, for example, in performing the methods steps of FIGS. 4A and 4B for network communications.

Defined is a set of basic permutations used for constructing a Latin square. For an n×n mapping, where $n = 2^m$, m basic permutations $\phi_i (1 \leq i \leq m)$ are defined as follows. Let the binary representation of a number $a \in \{0, 1, \ldots, n-1\}$ be $P_{m-1} P_{m-2} \ldots P_1 P_0$. Then $$P_{m-1} P_{m-2} \cdots P_i P_{i-1} P_{i-2} \cdots P_1 P_0 \xrightarrow{\phi_i} P_{m-1} P_{m-2} \cdots P_i \overline{P}_{i-1} P_{i-2} \cdots P_1 P_0 \quad (3)$$

The permutation $\phi_i$ is actually the operation flipping the $i^{th}$ bit of a binary number. $\phi_i$ may also be expressed as a composition of $\frac{n}{2}$ 2-cycles. For example, the three basic permutations for n=8 are $$\phi_1 = (0, 1)(2, 3)(4, 5)(6, 7)$$

$$\phi_2 = (0, 2)(1, 3)(4, 6)(5, 7)$$

$$\phi_3 = (0, 4)(1, 5)(2, 6)(3, 7)$$

Figure 5:
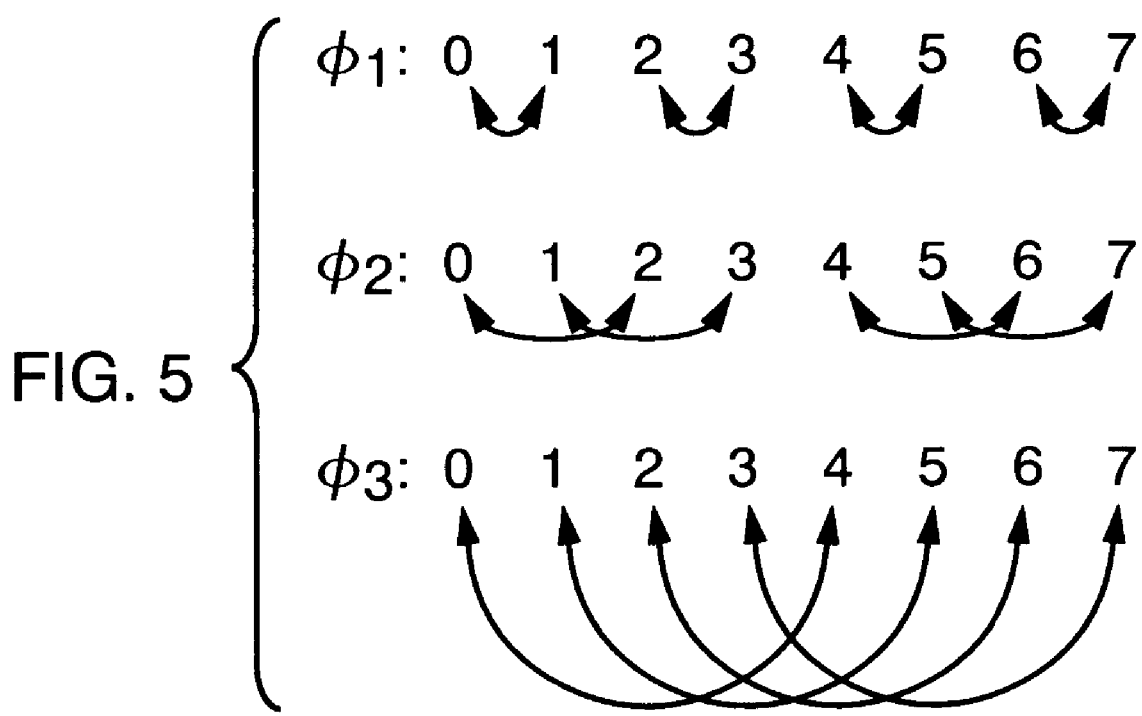
FIG. 5 is an example of an illustration of a basic permutation for an 8×8 mapping.

Referring now to FIG. 5, shown is a pictorial representation of the foregoing permutations $\phi_1$, $\phi_2$, and $\phi_3$.

Figure 6A:
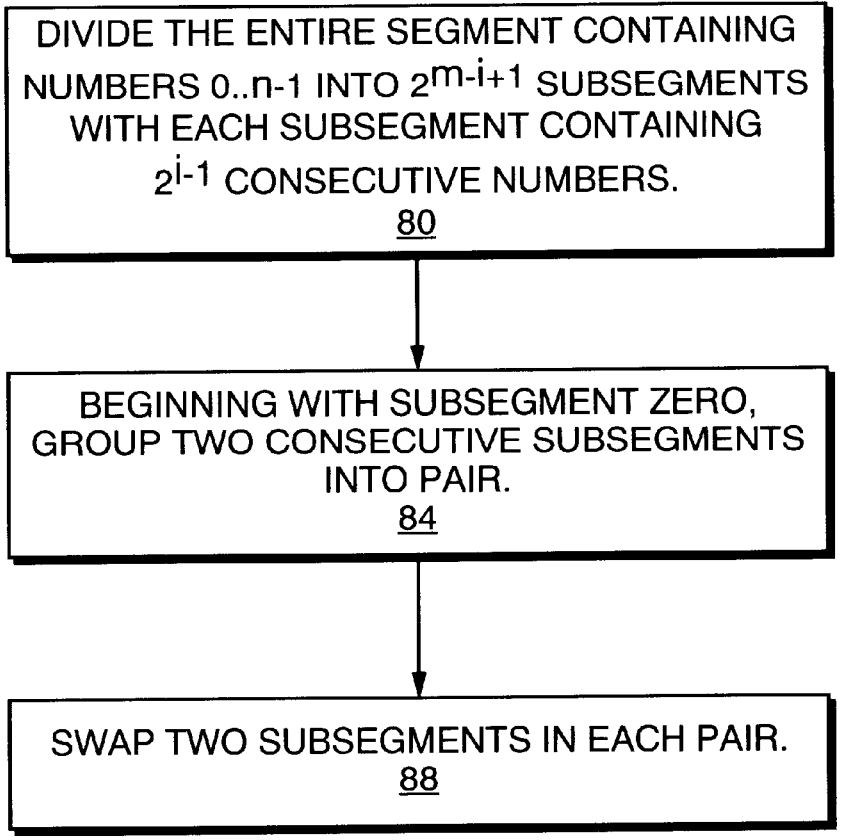
FIG. 6A is a flowchart depicting method steps of an embodiment for mapping numbers using basic permutations.

Referring now to FIG. 6A, shown are steps of one method for mapping numbers using the basic permutation. The mapping of n numbers 0, 1, 2, . . . , n−1 by the basic permutation $\phi_i$ ($1 \leq i \leq m = \log n$) is performed as follows. Divide the entire segment containing all n numbers into $2^{m-i+1}$ subsegments with each subsegment containing $2^{i-1}$ consecutive numbers, as at step 80. Starting from subsegment 0, group each two consecutive subsegments into a pair, as in step 84. Subsequently, as in step 88, swap two subsegments in each pair. As an example of applying these method steps of FIG. 6A, consider $\phi_2$ of FIG. 5. Divide eight numbers into four subsegments: $\|0, 1\|$, $\|2, 3\|$, $\|4, 5\|$ and $\|6, 7\|$. Then, swap the first pair of consecutive subsegments it $\|0, 1\|$ and $\|2, 3\|$, and also swap the second pair of consecutive subsegments $\|4, 5\|$ and $\|6, 7\|$. Thus, $\phi_2$ maps 0, 1, 2, 3, 4, 5, 6, 7 respectively to 2, 3, 0, 1, 6, 7, 4, 5.

Figure 6B:
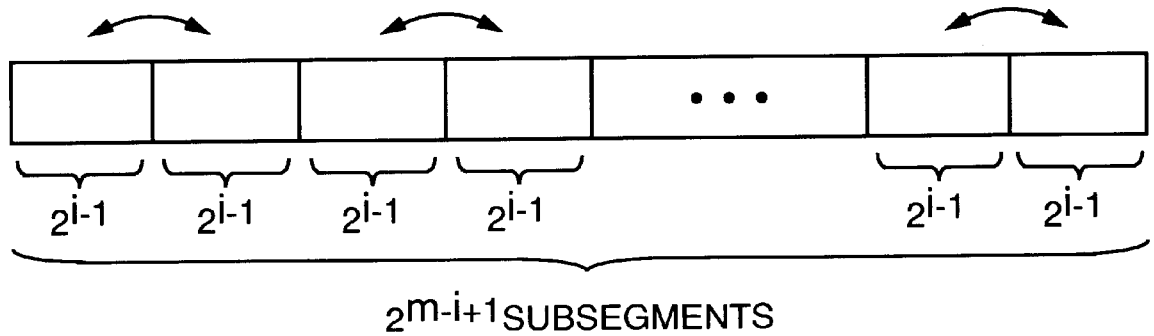
FIG. 6B is an example illustration of applying the method steps of FIG. 6A.

Referring now to FIG. 6B, shown is an example illustration of applying the method steps of FIG. 6A.

Prior to a description of using the basic permutations in constructing Latin squares, some relevant properties of basic permutations are described.

Lemma 2 The set of basic permutations $\phi_i$ ($1 \leq i \leq m$) defined in (3) has the properties that the composition of any two basic permutations is exchangeable, and the composition of two identical basic permutations equals the identity permutation. That is, $$\phi_i \phi_j = \phi_j \phi_i, \text{ for } 1 \leq i, j \leq m \quad (4)$$

and $$\phi_i \phi_i = 1, \text{ for } 1 \leq i \leq m \quad (5)$$

Proof. The exchangeability (4) may be determined from the definition of the basic permutations. Generally, any binary number $P_{m-1}P_{m-2} \ldots P_{i-1} \ldots P_1P_0$ may be mapped to $P_{m-2} \ldots P_{i-1} \ldots P_1P_0$ may be mapped to $P_{m-1}P_{m-2} \ldots \overline{P}_{i-1} \ldots \overline{P}_{j-1} P_1P_0$ by either permutation $\phi_i\phi_j$ or permutation $\phi_j\phi_i$.

Similarly, equation (5) holds true because applying the composition of two $\phi_i$'s implies first flipping the $i^{th}$ bit and then flipping it back.

Both properties in Lemma 2 will be relevant to later text.

The construction of a Latin square by using the basic permutations is now discussed.

Given m basic permutations $\phi_1, \phi_2, \ldots, \phi_m$, a permutation set is constructed of compositions of basic permutations as follows $$\Psi = \{\phi_{i_1}\phi_{i_2} \ldots \phi_{i_k} | m \geq i_1 \geq \ldots \geq i_k \geq 1 \text{ and } m \geq k \geq 1\} \quad (6)$$

For example, for n=8 there are $$\Psi = \{\phi_1, \phi_2, \phi_3, \phi_2\phi_1, \phi_3\phi_1, \phi_3\phi_2, \phi_3\phi_2\phi_1\}$$

Based on the properties (4) and (5) in Lemma 2, any composition of one or more basic permutations equals one of the permutations in Ψ. For example, take the composition $\phi_1\phi_2\phi_1$. Since $$\phi_1\phi_2\phi_1 = (\phi_1\phi_2)\phi_1 = (\phi_2\phi_1)\phi_1 = \phi_2(\phi_1\phi_1) = \phi_2 \cdot 1 = \phi_2,$$

this composition equals $\phi_2$ which belongs to Ψ.

Generally, in Ψ there are $\binom{m}{1}$ permutations which are composed of one basic permutation, $\binom{m}{2}$ permutations which are composed of two basic permutations, and so on. Since $$\binom{m}{1} + \binom{m}{2} + \ldots + \binom{m}{m} = 2^m - 1 = n - 1$$

it follows that $|\Psi| = n - 1$.

Based on the permutation set Ψ Latin squares may be constructed as described in the following theorem.

Theorem 1 Let $\rho_1, \rho_2, \ldots, \rho_{n-1}$ be the n−1 permutations in Ψ, and $a_0, a_1, \ldots, a_{n-1}$ be a list of numbers such that $\{a_0, a_1, \ldots, a_{n-1}\} = \{0, 1, \ldots, n-1\}$. Then the following matrix is a Latin square.

$$\begin{bmatrix} a_0 & a_1 & a_2 & \cdots & a_{n-1} \\ \rho_1(a_0) & \rho_1(a_1) & \rho_1(a_2) & \cdots & \rho_1(a_{n-1}) \\ \rho_2(a_0) & \rho_2(a_1) & \rho_2(a_2) & \cdots & \rho_2(a_{n-1}) \\ \vdots & \vdots & \vdots & \vdots & \vdots \\ \rho_{n-1}(a_0) & \rho_{n-1}(a_1) & \rho_{n-1}(a_2) & \cdots & \rho_{n-1}(a_{n-1}) \end{bmatrix} \quad (7)$$

Proof. Since $\{a_0, a_1, \ldots, a_{n-1}\} = \{0, 1, \ldots, n-1\}$ and each $\rho_i$ is a permutation, then the set of numbers in the $i^{th}$ row of the matrix, $\{\rho_i(a_0), \rho_i(a_1), \ldots, \rho_i(a_{n-1})\} = \{0, 1, \ldots, n-1\}$. That is, each row of the matrix forms a permutation.

Now consider the set of numbers in the $j^{th}$ column of the matrix, $\{a_j, \rho_1(a_j), \rho_2(a_j), \ldots, \rho_{n-1}(a_j)\}$. By the definition of Ψ in (6) and the definition of $\phi_i$ in (3), given a $\rho_i$, say, $\rho_i = \phi_4\phi_2\phi_1$, then $\rho_i(a_j)$ is the number obtained by flipping bit 4, bit 2 and bit 1 of the binary representation of number $a_j$. Generally, since $\rho_1, \rho_2, \ldots, \rho_{n-1}$ represent permutations which may flip the bits of a number in all possible ways, $a_j$, $\rho_1(a_j), \rho_2(a_j), \ldots, \rho_{n-1}(a_j)$ together cover the numbers in $\{0, 1, \ldots, n-1\}$. Thus, the column of the matrix also forms a permutation. Hence, the matrix is a Latin square.

Figure 7:
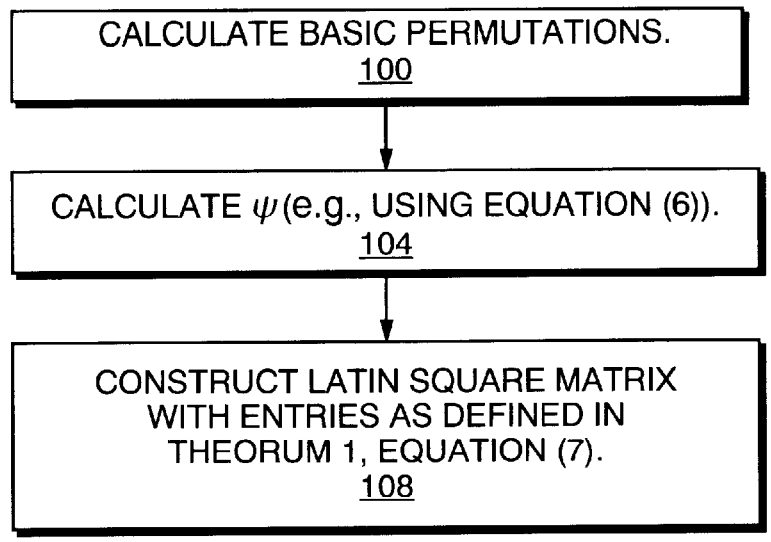
FIG. 7 is a flowchart depicting method steps of an embodiment of constructing a Latin square matrix.

Referring now to FIG. 7, shown is an example of an embodiment of the method steps of a first method for constructing a Latin square matrix. In other words, the flowchart steps of FIG. 7 summarize that method which has just been described using equations 6 and 7 to produce a Latin square matrix. In step 100, the basic permutations, $\phi_i$s, are calculated for i from 1 to m where m=log n. Recall that n is the dimension of the rows and columns in our n×n matrix and our n×n network. In step 104, Ψ is calculated using Equation 6. In step 108 the Latin square matrix is constructed with entries as defined using Equation 7 from Theorem 1.

The foregoing method for construction of a Latin square is generally useful in mathematically proving the existence of a Latin square for the MINs. However, the time complexity of generating a Latin square using this first technique may be quite high since each permutation in Ψ may contain up to m basic permutations. Therefore a second alternate method for constructing a Latin square matrix will now be described. The first technique generally has a greater time complexity than the second technique which will now be described.

Figure 8:
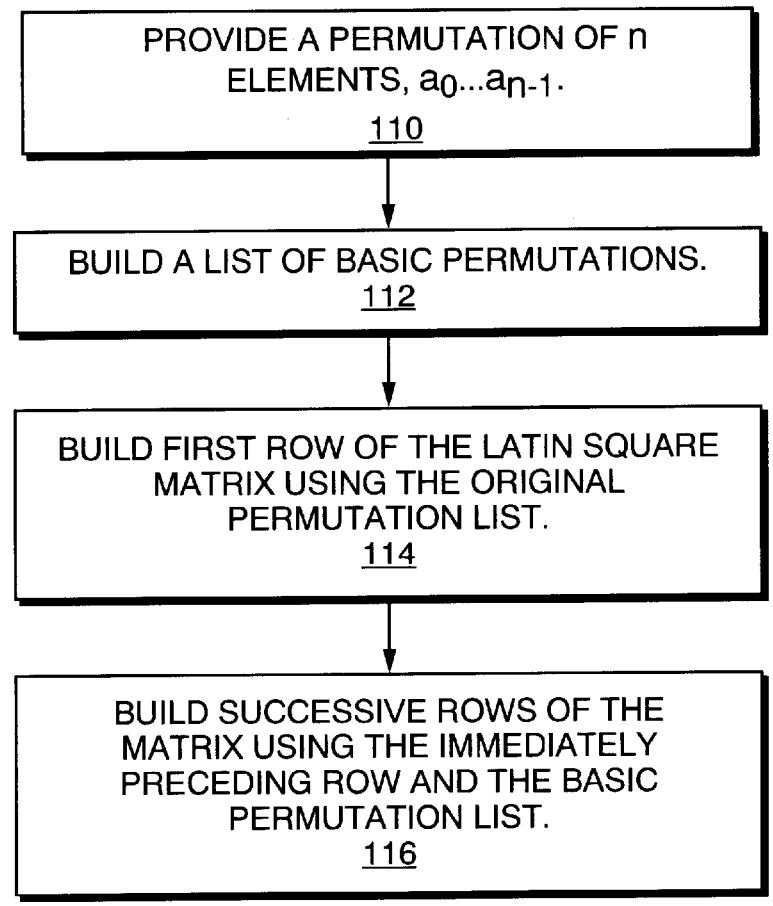
FIG. 8 is a flowchart depicting method steps of an embodiment of a second method of constructing a Latin square matrix.

The general technique of the second method for constructing a Latin square matrix will now be described. Referring now to FIG. 8, shown are the method steps of a second embodiment for constructing a Latin square matrix. At step 110, a permutation of the n elements $a_0 \ldots a_{n-1}$ is provided. Generally, as previously described, each of the elements $a_0 \ldots a_{n-1}$ corresponds to one of the processor nodes in the computer system 10, as in FIG. 1. In the next step 112, a list of basic permutations is built. Each of the basic permutations, as previously described, is a function providing a mapping of one of the processor nodes to another processor node. In this particular instance the list of basic permutations generates a list whose right-most bits form a Gray code sequence. This will be described in more detail in following text. At step 114, the first row of the Latin square matrix is constructed using the original permutation list as provided in step 110. The method proceeds to step 116 where successive rows of the Latin square matrix are built using the immediately preceding row and the basic permutation list. The basic permutations, for example at step 116, provide a mapping of a current row of the Latin square matrix to an immediately successive row of the Latin square matrix.

Generally, the method steps depicted in FIG. 8 construct a Latin square matrix in a row-by-row iterative fashion in the sense that the current row is obtained by applying a basic permutation in the list to a previously generated row. Details of each of these previously described steps of FIG. 8 are described in text which follows. It should be noted that since there are a total of n−1 basic permutations in the list and each of them is applied to n entries of a row, the time complexity of the construction of this method is of $O(n^2)$.

Following is Table II which contains a pseudo-code type description of the second technique for producing a Latin square matrix, as generally described in conjunction with FIG. 8.

TABLE II

The construction of a Latin square matrix

```
method LatinSquare (List {a₀, a₁, . . . , aₙ₋₁})/* main */
begin
    List BL <--- List { };
    BuildBaskList (m); /* m = log n */
    BuildLatinSquare(BL, {a₀, a₁, . . . , aₙ₋₁});
end;
Function BuildBasicList (int k)
begin
    if (k = = 1)
        BL.append(φ₁);
        return;
        end if
        BuildBasicList (k − 1)
        BL.append (φₖ);
        BuildBasicList (k − 1)
end;
    Function BuildLatinSquare(List{φ_{k₁}, φ_{k₂}, . . . φ_{k_{n−1}}},
    List{a₀, a₁, . . . , aₙ₋₁})
begin
    for i = 0 to n − 1 do
        if (i = = 0)
            b₀ = a₀; b₁ = a₁; . . . ; bₙ₋₁ = aₙ₋₁;
        else
            b₀ = φ_{k_i}(b₀); b₁ = φ_{k_i}(b₁); . . . ; bₙ₋₁ = φ_{k_i}(bₙ₋₁);
        end if;
        output List{b₀, b₁. . . , bₙ₋₁} as one row of the Latin square;
        end for;
end;
```

Following is a proof that this second technique produces a Latin square matrix.

Theorem 2 The matrix constructed by the method of Latin square in Table II is a Latin square.

Proof. First to be shown is that the number of basic permutations generated by function BuildBasicList (k) is $2^k-1$ so that there are $2^m-1=n-1$ basic permutations in the list passed to function BuildLatinSquare in main program LatinSquare. Let this number be P(k), then the following recurrence can be established as $$P(k)=2P(k-1)+1 \text{ and } P(1)=1 \tag{8}$$

The solution to the recurrence of equation (8) is $2^k-1$.

The LatinSquare method of Table II generates an n×n matrix by applying the basic permutation list to the original row, $a_0, a_1, \ldots, a_{n-1}$, in an iterative way. To prove the matrix generated is a Latin square, first focus on the case of applying the basic permutation list to a number $a_j$ iteratively. The first permutation in the list is applied to number $a_j$ to obtain a new number. Subsequently, the second permutation is applied to this new number to obtain another number; and so on. After exhausting the basic permutations in the list, a list of numbers is obtained which forms a column of the matrix.

Now described is the basic permutation list which contains the operations which generate a Gray code sequence. A k-bit Gray code sequence contains $2^k$ binary codewords, each of length k bits, in which two adjacent codewords differ in exactly one bit. For example, consider the basic permutation list $\{\phi_1, \phi_2, \phi_1, \phi_3, \phi_1, \phi_2, \phi_1\}$ for n=8. Referring now to FIG. 9A, shown are steps applying this list to number 0 to obtain {000, 001, 011, 010, 110, 111, 101, 100} in binary.

Generally, the following claim may be proven by induction: applying the basic permutation list outputted by BuildBasicList(k) to an m-bit binary number, $P_{m-1}P_{m-2} \ldots P_1P_0$, generates a list of the numbers of form $$p_{m-1}p_{m-2} \ldots p_k \underbrace{xx \ldots x}_{k},$$

whose k rightmost bits form a k-bit Gray code sequence. Note that the foregoing "k" above the string of "xx . . . x" is notation used to indicate the "k" rightmost bits in which each "x" in the "xx . . . x" denotes a bit.

First notice that given a binary number b and a basic permutation $\phi_i$, b and $\phi_i(b)$ differ only in the $i^{th}$ bit. When k=1, there is only permutation $\phi_1$, and the rightmost bit of the numbers generated $P_{m-1}P_{m-2} \ldots p_1x$, form a list $\{0, 1\}$ which is a 1-bit Gray code sequence. Assume the claim holds true for k−1. Now consider BuildBasicList(k). After the first call of BuildBasicList (k−1), there is a permutation list which generally generates numbers of form $$p_{m-1}p_{m-2} \ldots p_k p_{k-1} \underbrace{xx \ldots x}_{k-1},$$

whose (k−1) rightmost bits form a (k−1) bit Gray code sequence. Then add $\phi_k$ to the permutation list. Apply $\phi_k$ to the previous number by flipping the $k^{th}$ bit of the number to obtain a new number. Next, call BuildBasicList (k−1) again to add to the permutation list those permutations which may generate all numbers of form $$p_{m-1}p_{m-2} \ldots p_k \overline{p}_{k-1} \underbrace{xx \ldots x}_{k-1}$$

whose (k−1) rightmost bits form a (k−1)-bit Gray code sequence. Thus, the resulting permutation list generates all numbers of the form $$p_{m-1}p_{m-2}\cdots p_k \xrightarrow{k} xx\ldots x,$$

whose k rightmost bits form a k-bit Gray code sequence. It should be noted that the bar or line over the $p_{k-1}$ represents the complement or negation operation.

In the LatinSquare of Table II, the basic permutation list outputed by BuildBasicList (m) is applied to any $a_j(0 \leq a_j \leq n-1)$ in the original row, the resulting number list, which is column j of the matrix obtained by the method, consists of numbers of an m-bit Gray code sequence which covers $\{0, 1, \ldots, n-1\}$.

Additionally, the original row $a_0, a_1, \ldots, a_{n-1}$ includes the members of $\{0, 1, \ldots, n-1\}$, so does each of the other n-1 rows of the matrix. Thus, the resulting matrix is a Latin square.

Figure 9B:
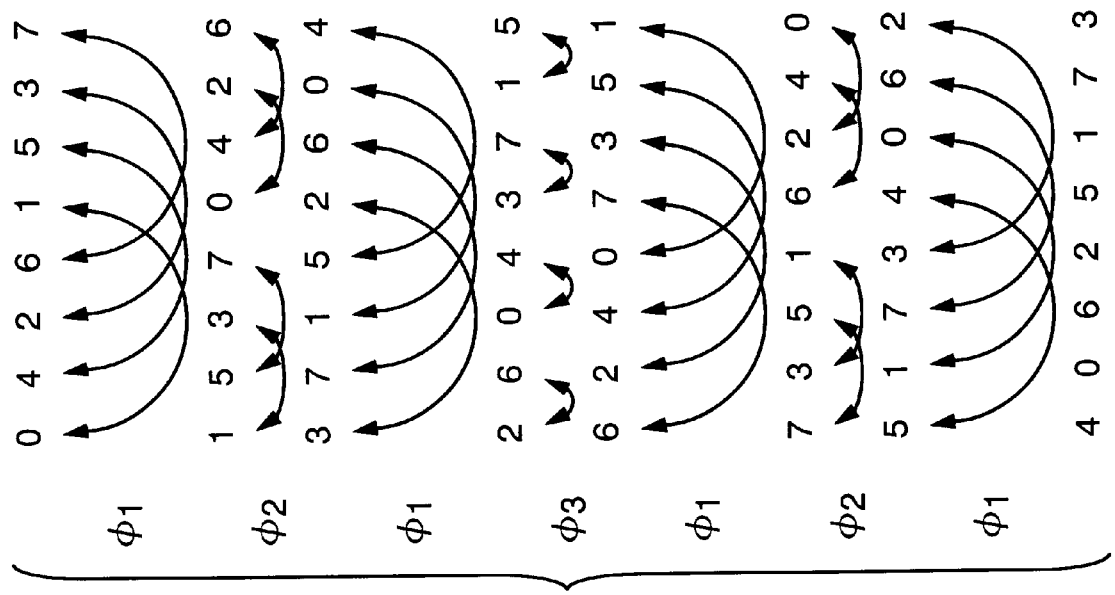
FIG. 9B is an example of an 8×8 Latin square matrix.
Figure 9A:
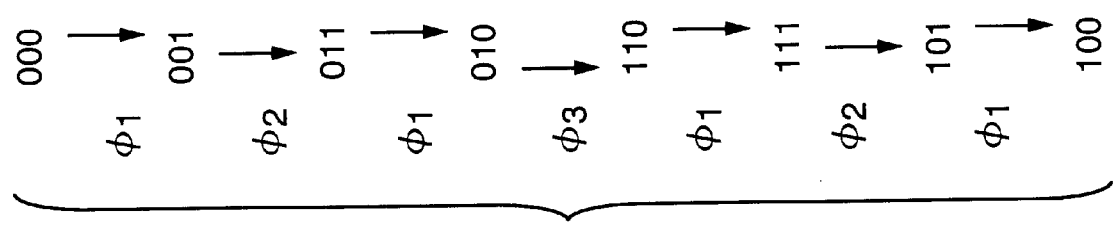
FIG. 9A depicts the various steps of transforming a number zero using a basic permutation list.

Referring now to FIG. 9B, shown is a Latin square generated by method LatinSquare of Table II.

Theorem 3 The Latin square in Theorem 2 is equivalent to that in Theorem 1.

Proof. Let the basic permutation list in Table II Latin-Square be $$\{\phi_{k_1},\phi_{k_2},\ldots,\phi_{k_{n-1}}\}.$$

Then the set of permutations which are applied to the original number list $\{a_0, a_1, \ldots, a_{n-1}\}$ in the method is $$\Psi'=\{\phi_k,\phi_{k_2}\phi_{k_1},\phi_{k_3}\phi_{k_2},\phi_{k_1},\ldots,\phi_{k_{n-1}}\phi_{k_{n-2}}\cdots\phi_{k_2}\phi_{k_1}\}$$

By Theorem 2, no two permutations in $\Psi'$ are the same, which yields $$|\Psi'|=n-1=|\Psi|.$$

Also using the properties (4) and (5) of basic permutations, any permutation in $\Psi'$ can be transformed to the format of $\Psi$ in (6). That is, $$\Psi'=\Psi$$

Thus, the Latin squares in Theorem 2 and Theorem 1 are equivalent.

An example to illustrate the proof of Theorem 3 is now given. For n=8, the basic permutation list is $\{\phi_1, \phi_2, \phi_1, \phi_3, \phi_1, \phi_2, \phi_1\}$. The following one-to-one correspondence between $\Psi'$ and $\Psi$ may be listed as:

$$\Psi' = \Psi$$
$$\phi_1 = \phi_1$$
$$\phi_2\phi_1 = \phi_2\phi_1$$
$$\phi_1\phi_2\phi_1 = \phi_2$$
$$\phi_3\phi_1\phi_2\phi_1 = \phi_3\phi_2$$
$$\phi_1\phi_3\phi_1\phi_2\phi_1 = \phi_3\phi_2\phi_1$$
$$\phi_2\phi_1\phi_3\phi_1\phi_2\phi_1 = \phi_3\phi_1$$
$$\phi_1\phi_2\phi_1\phi_3\phi_1\phi_2\phi_1 = \phi_3$$

The set of basic permutations $\phi_i(1 \leq i \leq m)$ and the Latin square matrix produced, for example, using the two methods previously described, are closely related to the class of self-routing MINS. Generally, admissible permutations for the class of self-routing MINs may be generated in a generic way to form the Latin square needed in the all-to-all personalized exchange method of Table I. In paragraphs that follow, set forth is a description of this generic way to generate Latin square matrices which may be used in self-routing MINs for all-to-all personalized exchange.

Generally, let each stage permutation, (as previously defined) $\phi_i=\phi_1$ or I. Recall that $\phi_1$ is the permutation (0, 1)(2, 3) . . . (n−2, n−1), and I is the identity permutation. Accordingly, all switches in each stage of the network are set to either cross or parallel to correspond, respectively, to $\phi_1$ and I.

In paragraphs that follow, it will be shown that this generic method for generating admissible permutations for use in a Latin square matrix is valid for baseline, omega and indirect binary n-cube networks. In fact, this approach may be generally applied to the entire class of self-routing MINs.

Recall, as set forth in previous descriptions included herein, the overall permutation of a baseline network is $\sigma_{m-1}\pi_{m-2}\cdots\pi_0\sigma_0$, where interstage permutations $\pi$'s are defined in (2) and the stage permutations $\sigma_i$'s now take either $\phi_1$ or I. The following lemmas represent properties of the compositions of $\pi_i$'s and $\phi_i$'s.

Lemma 3 The composition of $i(1 \leq i \leq m-1)$ consecutive interstage permutations $\pi_{m-2}\pi_{m-3}, \ldots, \pi_{m-i-1}$ is the following permutation $$p_{m-1}p_{m-2}\cdots p_{i+1}p_i\cdots p_1p_0 \xrightarrow{\pi_{m-2}\pi_{m-3}\cdots\pi_{m-i-1}} p_{m-1}p_{m-2}\cdots p_{i+1}p_0p_1\cdots p_i \quad (9)$$

Proof. Applying $\pi_{m-i-1}, \pi_{m-i}, \ldots, \pi_{m-3}, \pi_{m-2}$ one by one to a number $P_{m-1}P_{m-2}\cdots P_1P_0$, then $$p_{m-1}\cdots p_{i+1}p_i\cdots p_1p_0 \xrightarrow{\pi_{m-i-1}}$$
$$p_{m-1}\cdots p_{i+1}p_0p_i\cdots p_1 \xrightarrow{\pi_{m-i}} p_{m-1}\cdots p_{i+1}p_0p_1p_i\cdots p_3p_2 \xrightarrow{\pi_{m-i+1}}$$
$$\cdots \xrightarrow{\pi_{m-3}} p_{m-1}\cdots p_{i+1}p_0p_1\cdots p_{i+2}p_ip_{i-1} \xrightarrow{\pi_{m-2}}$$
$$p_{m-1}\cdots p_{i+1}p_0p_1\cdots p_{i-1}p_i$$

Let $$\pi=\pi_{m-2}\pi_{m-3}\cdots\pi_1\pi_0 \quad (10)$$

which is the composition of all $\pi_i$'s. $\pi$ may also be viewed as the overall permutation of a baseline network in which all switches are set to parallel.

The following Corollary gives a special case of Lemma 3, which indicates that $\pi$ maps a binary number to its inverse.

Corollary 1

$$p_{m-1}p_{m-2}\cdots p_1p_0 \xrightarrow{\pi} p_0p_1\cdots p_{m-2}p_{m-1} \quad (11)$$

Corollary 2 The composition of the $i(1 \leq i \leq m-1)$ consecutive $\pi_j$'s and $\phi_1$ satisfies the following equation:

$$(\pi_{m-2}\pi_{m-3}\cdots\pi_{m-i-1})\phi_1=\phi_{i+1}(\pi_{m-2}\pi_{m-3}\cdots\pi_{m-i-1}) \quad (12)$$

Proof. From Lemma 3 and mapping (3), it can be determined that the permutations on both sides of (12) map $P_{m-1}P_{m-2}\cdots P_1P_0$ to $P_{m-1}P_{m-2}\cdots P_{i+1}\overline{P_0}P_1\cdots P_i$.

Theorem 4 Let the stage permutation of each stage in a baseline network take either $\phi_1$ or I (i.e., the switches in this stage are either all set to cross or all set to parallel). The admissible permutations that correspond to these switch settings form a Latin square.

Proof. Since each stage permutation $\sigma_i$ takes either $\phi_1$ or I, the overall permutation $\sigma_{m-1}\pi_{m-2}\sigma_{m-2}\ldots\pi_0\sigma_0$ has the following general form for $k \geq 1$ and $0 \leq i_1 < i_2 < \ldots < i_k \leq m-1$ $$\pi_{m-2}\ldots\pi_{m-i_1-1}\phi_1\pi_{m-i_1-2}\ldots\pi_{m-i_2-1}\phi_1\pi_{m-i_2-2}\ldots\pi_{m-i_k-1}\phi_1\pi_{m-i_k-2}\ldots\pi_1\pi_0 \quad (13)$$

Notice that when $i_1 = 0$, (13) becomes $$\phi_1\pi_{m-2}\ldots\pi_{m-i_2-1}\sigma_1\pi_{m-i_2-2}\ldots\pi_{m-i_k-1}\phi_1\pi_{m-i_k-2}\ldots\pi_1\pi_0$$

By repeatedly using Corollary 2, (13) becomes $$(\phi_{i_1+1}\phi_{i_2+1}\ldots\phi_{i_k-1})(\pi_{m-2}\pi_{m-3}\ldots\pi_1\pi_0)=(\phi_{i_1-1}\phi_{i_2-1}\ldots\phi_{i_k-1})\pi=(\phi_{i_k+1}\phi_{i_k-1-1}\ldots\phi_{i_1-1})\pi$$

Comparing the set $$\{\phi_{i_k+1}\phi_{i_{k-1}+1}\ldots\phi_{i_1+1}1\; k\geq 1,\; 0\leq i_1 \leq i_2 \leq \ldots \leq i_k \leq m-1\}$$

with the definition of $\Psi$ in (6), it can be determined they are equivalent. Letting $a_0=\pi(0), a_1=\pi(1), \ldots a_{n-1}=\pi(n-1)$, and using Theorem 1, all permutations of form (13) form a Latin square. Additionally $\pi$ rcorresponds to the first row of the Latin square.

The second method of Table II LatinSquare(List $\{\pi(0), \pi(1), \ldots, \pi(n-1)\}$) may be used to construct the Latin square for a baseline network. For example, for an 8×8 network, the first row, $\pi(0), \pi(1), \ldots, \pi(n-1)$, is computed by Corollary 1, which is 0, 4, 2, 6, 1, 5, 3, 7. LatinSquare is then called to generate the remaining n−1 rows of the Latin square.

Referring now to FIGS. 10A–10H, possible switch settings for an 8×8 baseline network are shown. The corresponding Latin square is $L_1$ of (14) below. $L_2$ and $L_3$ in (14) will be used in the following paragraphs setting forth descriptions involving different networks.

$$L_1 = \begin{bmatrix} 0 & 4 & 2 & 6 & 1 & 5 & 3 & 7 \\ 1 & 5 & 3 & 7 & 0 & 4 & 2 & 6 \\ 3 & 7 & 1 & 5 & 2 & 6 & 0 & 4 \\ 2 & 6 & 0 & 4 & 3 & 7 & 1 & 5 \\ 6 & 2 & 4 & 0 & 7 & 3 & 5 & 1 \\ 7 & 3 & 5 & 1 & 6 & 2 & 4 & 0 \\ 5 & 1 & 7 & 3 & 4 & 0 & 6 & 2 \\ 4 & 0 & 6 & 2 & 5 & 1 & 7 & 3 \end{bmatrix} \quad (14)$$

$$L_2 = \begin{bmatrix} 0 & 1 & 2 & 3 & 4 & 5 & 6 & 7 \\ 1 & 0 & 3 & 2 & 5 & 4 & 7 & 6 \\ 3 & 2 & 1 & 0 & 7 & 6 & 5 & 4 \\ 2 & 3 & 0 & 1 & 6 & 7 & 4 & 5 \\ 6 & 7 & 4 & 5 & 2 & 3 & 0 & 1 \\ 7 & 6 & 5 & 4 & 3 & 2 & 1 & 0 \\ 5 & 4 & 7 & 6 & 1 & 0 & 3 & 2 \\ 4 & 5 & 6 & 7 & 0 & 1 & 2 & 3 \end{bmatrix}$$

$$L_3 = \begin{bmatrix} 0 & 2 & 4 & 6 & 1 & 3 & 5 & 7 \\ 1 & 3 & 5 & 7 & 0 & 2 & 4 & 6 \\ 5 & 7 & 1 & 3 & 4 & 6 & 0 & 2 \\ 4 & 6 & 0 & 2 & 5 & 7 & 1 & 3 \\ 6 & 4 & 2 & 0 & 7 & 5 & 3 & 1 \\ 7 & 5 & 3 & 1 & 6 & 4 & 2 & 0 \\ 3 & 1 & 7 & 5 & 2 & 0 & 6 & 4 \\ 2 & 0 & 6 & 4 & 3 & 1 & 7 & 5 \end{bmatrix}$$

Referring back to FIG. 2B, an omega network is depicted. In an n×n omega network, each of the log n interstage permutations is a shuffle function which is exactly $\pi_0^{-1}$, where $\pi_0$ is defined in (2). In fact, $\pi_0^{-1}$ is a 1-bit circular-left-shift operation, that is, $$p_{m-1}p_{m-2}\ldots p_1p_0 \xrightarrow{\pi_0^{-1}} p_{m-2}p_{m-3}\ldots p_1p_0p_{m-1} \quad (15)$$

The overall permutation of an omega network is $\sigma_{m-1}\pi_0^{-1}\sigma_{m-2}\pi_0^{-1}\ldots\phi_1\pi_0^{-1}\sigma_0\pi_0^{-1}$. Let $\pi_0^{-i}$ denote the composition of i permutations $\pi_0^{-i}{}_s$.

Lemma 4

$$\pi_0^{-i}\phi_1 = \phi_{i+1}\pi_0^{-i} \text{ for } \leq i \leq m-1 \quad (16)$$

$$\pi_0^{-m} = I \quad (17)$$

Proof. When repeatedly applying $\pi_0^{-1}$ to a binary number $P_{m-1}P_{m-2}\ldots P_1P_0$, obtained is:

$$\pi_0^{-1}\pi_0^{-1}\pi_0^{-1}p_{m-1}p_{m-2}\ldots p_1p_0 \to p_{m-2}p_{m-3}\ldots p_1p_0p_{m-1} \to p_{m-3}\ldots p_1p_0p_{m-1}p_{m-2} \to \ldots$$

In general, for $0 \leq i \leq m-1$, $$p_{m-1}p_{m-2}\ldots p_1p_0 \xrightarrow{\pi_0^{-i}} p_{m-i-1}p_{m-i-2}\ldots p_1p_0p_{m-1}\ldots p_{m-i} \quad (18)$$

Letting $i = m-1$ and applying $\pi_0^{-1}$ one more time, (17) holds true.

To prove (16), in one instance there is $$p_{m-1}p_{m-2}\ldots p_1p_0 \xrightarrow{\pi_0^{-1}\phi_1} p_{m-i-1}p_{m-i-2}\ldots p_1\overline{p_0}p_{m-1}\ldots p_{m-i}$$

In another instance, by applying $\phi_{i+1}\pi_0^{-i}$ to $P_{m-1}P_{m-2}\ldots P_1P_0$, $P_{m-i-1}P_{m-i-2}\ldots P_1\overline{P}_0P_{m-1}P_{m-i}$ may also be obtained. Therefore, equation $\pi_0^{-1}\phi_1 = \phi_{i+1}\pi_0^{-i}$ holds true.

Note that $\pi_0^{-m}$ is the overall permutation of an omega network in which all switches are set to parallel. By (17), this permutation equals the identity permutation.

A theorem for omega networks exists which is similar to theorem 4 for baseline networks.

Theorem 5 Let the stage permutation of each stage in an omega network take either $\phi_1$ or I (i.e., the switches in this stage are either all set to cross or all set to parallel). The admissible permutations that correspond to these switch settings form a Latin square.

Proof. Since each stage permutation $\sigma_i$ takes either $\phi_1$ or I, the overall permutation takes the following format for $k \geq 2$, $i_1 \geq 0$, $i_2, \ldots, i_k \geq 1$, and $i_1 + i_2 + \ldots + i_k = m$ $$\pi_0^{-i_1}\phi_1\pi_0^{-i_2}\phi_1\ldots\pi_0^{-i_k}\phi_1\pi_0^{-i_k} \quad (19)$$

By repeatedly using Lemma 4, $$\pi_0^{-i_1}\phi_1\pi_0^{-i_2}\phi_1\ldots\pi_0^{-i_{k-1}}\phi_1\pi_0^{-i_k} \; by_=(16) \; \phi_{i_1+1}\phi_{(i_1-i_2)-1}$$
$$\phi_{(i_1+i_2+i_3)-1}\ldots\phi_{\sum_{j=1}^{k-1}i_j+1}\pi_0^{-m} \; by_=(17)\phi_{i_1+1}\phi_{(i_1-i_2)-1}\phi_{(i_1+i_2+i_3)+1}$$
$$\ldots\phi_{\sum_{j=1}^{k-1}i_j+1} \; by_=(4) \; \phi_{\sum_{j=1}^{k-1}i_j+1}\phi_{\sum_{j=1}^{k-2}i_j+1}\ldots\phi_{(i_1+i_2)+1}\phi_{i_1+1}$$

It may be verified that the set $$\left\{\phi_{\sum_{j=1}^{k-1} i_j+1} \phi_{\sum_{j=1}^{k-2} i_j+1} \cdots \phi_{(i_1+i_2)+1} \phi_{i_1-1} \,\middle|\, k \geq 2, \right.$$
$$\left. i_1 \geq 0, i_2 \ldots i_k \geq 1, i_1 + i_2 + \ldots + i_k = m \right\}$$

is equal to $\Psi$ in (6). Letting $a_0, a_1=1, \ldots, a_{n-1}=n-1$, and using Theorem 1, all permutations of form (19) form a Latin square.

The method LatinSquare(List $\{0, 1, 2, \ldots, n-1\}$) of Table II may be used to construct the Latin square for an omega network. Referring now to FIGS. 11A–11H, switch settings in an 8×8 omega network are depicted. The corresponding Latin square is L2 in (14), as previously set forth.

In following paragraphs, a description regarding the generic method for self-routing networks as used with an indirect binary n-cube network. Let $\tau_j$ denote the interstage permutation between stage i and i+1 for $0 \leq i \leq m-2$ in an indirect binary n-cube network. $\tau_i$ represents the following mapping $$p_{m-1}p_{m-2} \cdots p_{i+2}p_{i+1}p_i \cdots p_1p_0 \xrightarrow{\tau_i} \qquad (20)$$
$$p_{m-1}p_{m-2} \cdots p_{i+2}p_0p_i \cdots p_1p_{i+1},$$

which is the function of swapping bit 1 and bit i+2. Similar to a baseline network, the overall m permutation of an indirect binary n-cube network is $\sigma_{m-1}\tau_{m-2}\sigma_{m-2} \cdots \tau_0\sigma_0$, and the stage permutations $\sigma_i$'s are now taking either $\phi_1$ or I. Let $$\tau = \tau_{m-2}\tau_{m-3} \cdots \tau_1\tau_0 \qquad (21)$$

which is the overall permutation corresponding to that all switches in the network are set to parallel.

Lemma 5 The composition of i($1 \leq i \leq m-1$) consecutive interstage permutations $\tau_{m-2}, \tau_{m-3}, \ldots, \tau_{m-i-1}$ is the following permutation $$p_{m-1}p_{m-2} \cdots p_{m-i+1}p_{m-i}p_{m-i-1} \cdots p_1p_0 \xrightarrow{\tau_{m-2}\tau_{m-3} \cdots \tau_{m-i-1}} \qquad (22)$$
$$p_{m-2} \cdots p_{m-i+1}p_{m-i}p_0p_{m-i-1} \cdots p_2p_1p_{m-1}$$

Proof. Applying $\tau_{m-i-1}, \tau_{m-i}, \ldots \tau_{m-3}, \tau_{m-2}$ one by one to a binary number $P_{m-1}P_{m-2} \cdots P_1P_0$, then $$p_{m-1} \cdots p_{m-i+1}p_{m-i}p_{m-i-1} \cdots p_1p_0 \xrightarrow{\tau_{m-i-1}}$$
$$p_{m-1} \cdots p_{m-i+1}p_0p_{m-i-1} \cdots p_1p_{m-i} \xrightarrow{\tau_{m-i}}$$
$$p_{m-1} \cdots p_{m-i+2}p_{m-i}p_0p_{m-i-1} \cdots p_1p_{m-i+1} \xrightarrow{\tau_{m-i+1}}$$
$$\cdots \xrightarrow{\tau_{m-3}} p_{m-1}p_{m-3} \cdots p_{m-i+1}p_{m-i}p_0p_{m-i-1} \cdots p_1p_{m-2} \xrightarrow{\tau_{m-2}}$$
$$p_{m-2} \cdots p_{m-i+1}p_{m-i}p_0p_{m-i-1} \cdots p_1p_{m-1}$$

The following Corollary indicates that $\tau$ defined in (21) is actually a 1-bit circular-left-shift operation.

Corollary 3

$$p_{m-1}p_{m-2} \cdots p_1p_0 \xrightarrow{\tau} p_{m-2} \cdots p_2p_1p_0p_{m-1} \qquad (23)$$

Proof. Letting i=m−1 in Lemma 5.

Corollary 4 The composition of the i($1 \leq i \leq m-1$) consecutive $\tau_j$'s and $\phi_1$ satisfies the following equation:

$$(\tau_{m-2}\tau_{m-3} \cdots, \tau_{m-i-1})\phi_1 = \phi_{m-i+1}(\tau_{m-2}\tau_{m-3} \cdots, \tau_{m-i-1}) \qquad (24)$$

Proof. By Lemma 5 and the definition of $\phi_1$ in (3), both permutations map $$P_{m-1}P_{m-2} \cdots P_1P_0$$

to $$P_{m-2} \cdots P_{m-i-1}\overline{P}_0 P_{m-i-1} \cdots P_1P_{m-1}$$

Theorem 6 Let the stage permutation of each stage in an indirect binary n-cube network take either $\phi_1$ or I (i.e., the switches in this stage are either all set to cross or all set to parallel). The admissible permutations that correspond to these switch settings form a Latin square.

Proof. Since each stage permutation $\sigma_i$ takes either $\phi_1$ or I, the overall permutation $\sigma_{m-1}\tau_{m-2}\sigma_{m-2} \cdots \tau_0\sigma_0$ has the following general form for $k \geq 1$ and $0 \leq i_1 < i_2 < \ldots < i_k \leq m-1$ $$\tau_{m-2} \cdots \tau_{m-i_1-1}\phi_1\tau_{m-i_1-2} \cdots \tau_{m-i_2-1}\phi_1\tau_{m-i_2-2} \cdots \tau_{m-i_k-1}$$
$$\phi_1\tau_{m-i_k} \cdots \tau_1\tau_0 (25)$$

Notice that when $i_1=0$, (25) becomes $$\phi_1\tau_{m-2} \cdots \tau_{m-i_2}\phi_1\tau_{m-i_2-2} \cdots \tau_{m-i_k-1}\phi_1\tau_{m-i_k-2} \cdots \tau_1\tau_0$$

by repeatedly using Corollary 4, (25) becomes $$(\phi_{m-i_1+1}\phi_{m-i_2+1} \cdots \phi_{m-i_k+1})(\tau_{m-2}\tau_{m-3} \cdots \tau_1\tau_0) = (\phi_{m-i_1-1}\phi_{m-i_2-1} \cdots \phi_{m-i_k-1})\tau \text{ for } i_1 \geq 1$$

or $$(\phi_1\sigma_{m-i_2-1} \cdots \sigma_{m-i_k-1})\tau = (\phi_{m-i_2-1} \cdots \phi_{m-i_k-1}\phi_1)\tau \text{ for } i_1=0.$$

Comparing the set $$\{\phi_{m-i_1+1}\phi_{m-i_2+1} \cdots \phi_{m-i_k+1} | k \geq 1, 1 \leq i_1 < i_2 < \ldots < i_k \leq m-1\}$$
$$\cup \{\phi_{m-i_2-1} \cdots \phi_{m-i_k-1}\phi_1 | k \geq 1, 0 = i_1 < i_2 < \ldots < i_k \leq m-1\}$$

with the definition of $\Psi$ in (6), it can be determined that they are equivalent. Letting $a_0 = \tau(0), a_1 = \tau(1), \ldots, a_{n-1} = \tau(n-1)$ and using Theorem 1, all permutations of form (13) form a Latin square. Moreover, corresponds to the first row of the Latin square.

Method 2 of Table II LatinSquare(List $\{\tau(0), \tau(1), \ldots, \tau(n-1)\}$) may be used to construct the Latin square for an indirect binary n-cube network. Referring now to FIGS. 12A–12H in FIG. 9, possible switch settings in an 8×8 indirect binary n-cube network are depicted. The corresponding Latin square is L3 in (14).

In following paragraphs, summarized is the general time complexity of the all-to-all personalized exchange method for the MIN subclass of self-routing networks. Generally, the method for an all-to-all personalized exchange using self-routing networks takes $O(n + \log n) = O(n)$ time, which matches the lower bound for this type of network within a constant factor. Constructing a Latin square matrix using the second method as previously described takes $O(n^2)$ time. Note that the Latin square construction methods previously described may be run once off-line at the time a network is built, and the Latin square matrix associated with the network may be viewed as one of the system parameters. Therefore, the time complexity of this method is not included in the communication delay.

Now the time complexity of the all-to-all personalized exchange method as used in a self-routing MIN network is generally compared with known techniques for other network topologies, including hypercube and 2D and 3D mesh/torus networks. In addition, also compared are the node degree, which reflects the number of I/O ports of each node, and the diameter, which is related to data transmission time. The comparison results are listed in Table III.

TABLE III

Comparisons of various networks used for all-to-all personalized exchange

| Network type | Hypercube 1-port model | Hypercube all-port model | 2D mesh/torus | 3D mesh/torus | Baseline, etc. |
|---|---|---|---|---|---|
| Node degree | log n | log n | 4 | 6 | 1 |
| Diameter/ No. Stages | log n | log n | $O(n^{1/2})$ | $O(n^{1/3})$ | log n |
| Communication delay | $O(n \log n)$ | $O(n)$ | $O(n^{3/2})$ | $O(n^{4/3})$ | $O(n)$ |

From Table III, the previously disclosed methods for the class of self-routing multistage interconnection networks (MINs) achieves a lower time complexity for all-to-all personalized exchange than with other network types. In terms of node degree, which reflects the scalability of a network, the MIN networks previously described are comparable to a mesh or a torus, while a hypercube has a node degree of log n. Thus, a multistage interconnection network (MIN), particularly a self-routing MIN, may generally be a good choice for implementing all-to-all personalized exchange due to its short communication delay and scalability.

In this application, presented is an all-to-all personalized exchange method for use with the class of MINs. The new method is based on a Latin square matrix, which corresponds to a set of admissible permutations of a MIN and may be viewed as a system parameter of the network. Disclosed are first and second methods for constructing the Latin square matrix used in the personalized exchange technique. Also disclosed is a generic method for decomposing all-to-all personalized exchange patterns into admissible permutations to form the Latin square matrix for a subclass of the MIN class, those self-routing or unique path networks. By taking advantage of the property of a MIN having a single input/output port per node, the MIN is useful and efficient in implementing all-to-all personalized exchange due to its shorter communication latency and better scalability than non-MIN networks.

The foregoing description sets forth a technique using a MIN network that affords a flexible and efficient way of performing all-to-all communications using a Latin Square matrix for use in a variety of embodiments. Additionally, two techniques for generating a Latin square matrix were set forth. These two techniques afford a flexible way for generating a Latin square matrix that may be used in any type of MIN network. Additionally, for a particular type of MIN network, the self-routing network, a generic technique is described which affords a flexible and efficient method of generating admissible permutations that are included in a Latin square matrix for performing all-to-all personalized message exchange.

The foregoing technique for performing all-to-all personalized message exchange is scalable for use in applications with a large number of nodes that communicate while simultaneously minimizing the communication delay.

Having described preferred embodiments of the invention, it will now become apparent to those of skill in the art that other embodiments incorporating its concepts may be provided. It is felt, therefore, that this invention should not be limited to the disclosed embodiments, but rather should be limited only by the spirit and scope of the appended claims.

What is claimed is:

1. A method for performing all-to-all personalized exchanges in a system that includes a plurality of first and second nodes connected to a multistage interconnection network, comprising:

determining a Latin square matrix that includes n rows and n columns, the Latin square matrix including a plurality of entries identifying the second nodes;

preparing, by each of the first nodes, a message intended for each of the second nodes identified in the Latin square matrix; and sending, by each of the first nodes, the message to each of the second nodes via the multistage interconnection network.

2. The method of claim 1, wherein the determining a Latin square matrix includes:

calculating m basic permutations, denoted $\phi_1, \phi_2, \ldots, \phi_m$, by $\phi_i (1 \leq i \leq m)$, m being equal to base-two-logarithm of n, each $\phi_i$ representing negating an $i^{th}$ bit of a binary number, calculating the permutation set having n−1 members, denoted $\rho_1, \rho_2, \ldots \rho_{n-1}$, the permutation set being constructed as follows:

$$\{\phi_{i1}\phi_{i2} \ldots \phi_{ik} | m \geq i_1 > i_2 > \ldots > i_k \geq 1 \wedge m \geq k \geq 1\},$$

defining a list of numbers $a_0, a_1, \ldots a_{n-1}$ such that $\{a_0, a_1, \ldots a_{n-1}\} = \{0, 1, \ldots n-1\}$, and calculating each entry of the Latin square matrix as:

$$\begin{bmatrix} \alpha_0 & \alpha_1 & \alpha_2 & \cdots & \alpha_{n-1} \\ \rho_1(\alpha_0) & \rho_1(\alpha_1) & \rho_1(\alpha_2) & \cdots & \rho_1(\alpha_{n-1}) \\ \rho_2(\alpha_0) & \rho_2(\alpha_1) & \rho_2(\alpha_2) & \cdots & \rho_2(\alpha_{n-1}) \\ \vdots & \vdots & \vdots & \vdots & \vdots \\ \rho_{n-1}(\alpha_0) & \rho_{n-1}(\alpha_1) & \rho_{n-1}(\alpha_2) & \cdots & \rho_{n-1}(\alpha_{n-1}) \end{bmatrix}.$$

3. The method of claim 1, wherein the Latin square matrix includes a matrix in which no two entries in each of the rows are equivalent and no two entries in each of the columns are equivalent.

4. The method of claim 3, wherein the determining a Latin square matrix includes:

providing a list of n elements in which each of the elements is a number, building a list of basic permutations of the list in which each of the basic permutations is a function providing a mapping of a first one of the elements to a second of the elements, the function representing flipping one of the bits in a binary representation of the first element producing the second element, the list of basic permutations generating a list of numbers whose rightmost bits form a gray code sequence, building a first row of the Latin square matrix using the list, and building successive rows of the Latin square matrix in which each of the rows of the Latin square matrix is produced using the immediately prior row of the Latin square matrix and the functions defined by the list of basic permutations.

5. The method of claim 4, wherein the multistage interconnection network is a baseline network, and the list of n elements is constructed using interstage permutations, each of the interstage permutations being predetermined in accordance with topology of the baseline network.

6. The method of claim 4, wherein the multistage interconnection network is an omega network, and the list of n elements is constructed using interstage permutations, each of the interstage permutations being predetermined in accordance with topology of the omega network.

7. The method of claim 4, wherein the multistage interconnection network is an indirect binary n-cube network, and the list of n elements is constructed using interstage permutations, each of the interstage permutations being predetermined in accordance with topology of the indirect binary n-cube network.

8. The method of claim 1, wherein the entries in the Latin square matrix identify the second nodes $\alpha_{i,j}$, where $0 \leq j \leq n-1$ and $0 \leq i \leq n-1$; and the preparing a message by a first node j includes:

sequentially preparing a message from the first node j to each of the second nodes $a_{i,j}$ identified in the Latin square matrix.

9. The method of claim 8, wherein the sending each of the messages by the first node j includes:

sequentially sending one of the messages from the first node j to each of the second nodes $a_{i,j}$ through the multistage interconnection network.

10. The method of claim 9 wherein the sending each of the messages by the first node j further includes:

outputting each of the messages to input j of the multistage interconnection network.

11. A method for performing all-to-all personalized exchanges in a system that includes a plurality of nodes connected to a multistage interconnection network, comprising:

determining a Latin square matrix that includes n rows and n columns, the Latin square matrix including a plurality of destination addresses $a_{i,j}$, where $0 \leq j \leq n-1$ and $0 \leq i \leq n-1$;

performing in parallel for each of the nodes j:

sequentially preparing, for each of the destination addresses $a_{i,j}$, a message from the node j to one of the nodes identified by the destination address $a_{i,j}$, and storing each of the messages in a queue; and performing in parallel for each of the nodes j:

sequentially sending each of the messages from the node j to each of the destination addresses $a_{i,j}$.

12. The method of claim 11, wherein the determining a Latin square matrix includes:

calculating m basic permutations, denoted $\phi_1, \phi_2, \ldots, \phi_m$, by $\phi_i(1 \leq i \leq m)$, m being equal to base-two-logarithm of n, each $\phi_i$ representing negating an $i^{th}$ bit of a binary number, calculating the permutation set having n-1 members, denoted $\rho_1, \rho_2, \ldots \rho_{n-1}$, the permutation set being constructed as follows:

$\{\rho_{i1}\phi_{i2} \ldots \phi_{ik} | m \geq i_1 > i_2 > \ldots > i_k \geq 1 \wedge m \geq k \geq 1\}$, defining a list of numbers $a_0, a_1, \ldots a_{n-1}$ such that $\{a_0, a_1, \ldots a_{n-1}\} = \{0, 1, \ldots n-1\}$, and calculating each entry of the Latin square matrix as:

$$\begin{bmatrix} \alpha_0 & \alpha_1 & \alpha_2 & \cdots & \alpha_{n-1} \\ \rho_1(\alpha_0) & \rho_1(\alpha_1) & \rho_1(\alpha_2) & \cdots & \rho_1(\alpha_{n-1}) \\ \rho_2(\alpha_0) & \rho_2(\alpha_1) & \rho_2(\alpha_2) & \cdots & \rho_2(\alpha_{n-1}) \\ \vdots & \vdots & \vdots & \vdots & \vdots \\ \rho_{n-1}(\alpha_0) & \rho_{n-1}(\alpha_1) & \rho_{n-1}(\alpha_2) & \cdots & \rho_{n-1}(\alpha_{n-1}) \end{bmatrix}.$$

13. The method of claim 11, wherein the Latin square matrix includes a matrix in which no two entries in each of the rows are equivalent and no two entries in each of the columns are equivalent.

14. The method of claim 13, wherein the determining a Latin square matrix includes:

providing a list of n elements in which each of the elements is a number, building a list of basic permutations of the list in which each of the basic permutations is a function providing a mapping of a first one of the elements to a second of the elements, the function representing flipping one of the bits in a binary representation of the first element producing the second element, the list of basic permutations generating a list of numbers whose rightmost bits form a gray code sequence, building a first row of the Latin square matrix using the list, and building successive rows of the Latin square matrix in which each of the rows of the Latin square matrix is produced using the immediately prior row of the Latin square matrix and the functions defined by the list of basic permutations.

15. The method of claim 14, wherein the multistage interconnection network is a baseline network, and the list of n elements is constructed using interstage permutations, each of the interstage permutations being predetermined in accordance with topology of the baseline network.

16. The method of claim 14, wherein the multistage interconnection network is an omega network, and the list of n elements is constructed using interstage permutations, each of the interstage permutations being predetermined in accordance with topology of the omega network.

17. The method of claim 14, wherein the multistage interconnection network is an indirect binary n-cube network, and the list of n elements is constructed using interstage permutations, each of the interstage permutations being predetermined in accordance with topology of the indirect binary n-cube network.

18. The method of claim 11, wherein the sequentially sending each of the messages includes:

outputting each of the messages to input j of the multistage interconnection network.

19. A system for performing all-to-all personalized exchanges in an environment that includes a plurality of first and second nodes connected to a multistage interconnection network, comprising:

means for determining a Latin square matrix that includes a same number of rows and columns, the Latin square matrix including a plurality of entries that identify the second nodes;

means for preparing a message from each of the first nodes to each of the second nodes identified in the Latin square matrix; and means for sending the message from each of the first nodes to each of the second nodes via the multistage interconnection network.

20. The system of claim 19, wherein the means for determining a Latin square matrix includes:

means for calculating m basic permutations, denoted $\phi_1, \phi_2, \ldots \phi_m$, by $\phi_i(1 \leq i \leq m)$, m being equal to base-twologarithm of n, each $\phi_i$ representing negating an $i^{th}$ bit of a binary number, means for calculating the permutation set having n−1 members, denoted $\rho_1, \rho_2, \ldots \rho_{n-1}$, the permutation set being constructed as follows:

$$\{\phi_{i1}\phi_{i2} \ldots \phi_{ik} | m \geq i_1 > i_2 > \ldots > i_k \geq 1 \wedge m \geq k \geq 1\},$$

means for defining a list of numbers $a_0, a_1, \ldots a_{n-1}$ such that $\{a_0, a_1, \ldots a_{n-1}\} = \{0, 1, \ldots n-1\}$, and means for calculating each entry of the Latin square matrix as:

$$\begin{bmatrix} \alpha_0 & \alpha_1 & \alpha_2 & \cdots & \alpha_{n-1} \\ \rho_1(\alpha_0) & \rho_1(\alpha_1) & \rho_1(\alpha_2) & \cdots & \rho_1(\alpha_{n-1}) \\ \rho_2(\alpha_0) & \rho_2(\alpha_1) & \rho_2(\alpha_2) & \cdots & \rho_2(\alpha_{n-1}) \\ \vdots & \vdots & \vdots & \vdots & \vdots \\ \rho_{n-1}(\alpha_0) & \rho_{n-1}(\alpha_1) & \rho_{n-1}(\alpha_2) & \cdots & \rho_{n-1}(\alpha_{n-1}) \end{bmatrix}.$$

21. The system of claim 19, wherein the Latin square matrix includes a matrix in which no two entries in each of the rows are equivalent and no two entries in each of the columns are equivalent.

22. The system of claim 21, wherein the means for determining a Latin square matrix includes:

means for providing a list of n elements in which each of the elements is a number, means for building a list of basic permutations of the list in which each of the basic permutations is a function providing a mapping of a first one of the elements to a second of the elements, the function representing flipping one of the bits in a binary representation of the first element producing the second element, the list of basic permutations generating a list of numbers whose rightmost bits form a gray code sequence, means for building a first row of the Latin square matrix using the list, and means for building successive rows of the Latin square matrix in which each of the rows of the Latin square matrix is produced using the immediately prior row of the Latin square matrix and the functions defined by the list of basic permutations.

23. The system of claim 19, wherein the multistage interconnection network is one of a baseline network, an omega network, and an indirect binary n-cube network.

24. A system for performing all-to-all personalized exchanges in an environment that includes a plurality of nodes connected to a multistage interconnection network, comprising:

means for determining a Latin square matrix that includes n rows and n columns, the Latin square matrix including a plurality of destination addresses $a_{i,j}$, where $0 \leq j \leq n-1$ and $0 \leq i \leq n-1$;

means for sequentially preparing, in parallel by each of the nodes j and for each of the destination addresses $a_{i,j}$, a message from the node j to one of the nodes identified by the destination address $a_{i,j}$;

means for storing the message; and means for sequentially sending, in parallel by each of the nodes j, the message from the node j to each of the destination addresses $a_{i,j}$.

25. The system of claim 24, wherein the means for determining a Latin square matrix includes:

means for calculating m basic permutations, denoted $\phi_1, \phi_2, \ldots \phi_m$, by $\phi_i(1 \leq i \leq m)$, m being equal to base-two-logarithm of n, each $\phi_1$ representing negating an $i^{th}$ bit of a binary number, means for calculating the permutation set having n−1 members, denoted $\rho_1, \rho_2, \ldots \rho_{n-1}$, the permutation set being constructed as follows:

$$\{\phi_{i1}\phi_{i2}, \ldots \phi_{ik} | m \geq i_1 > i_2 > \ldots > i_k \geq 1 \wedge m \geq k \geq 1\},$$

means for defining a list of numbers $a_0, a_1, \ldots a_{n-1}$ such that $\{a_0, a_1, \ldots a_{n-1}\} = \{0, 1, \ldots n-1\}$, and means for calculating each entry of the Latin square matrix as:

$$\begin{bmatrix} \alpha_0 & \alpha_1 & \alpha_2 & \cdots & \alpha_{n-1} \\ \rho_1(\alpha_0) & \rho_1(\alpha_1) & \rho_1(\alpha_2) & \cdots & \rho_1(\alpha_{n-1}) \\ \rho_2(\alpha_0) & \rho_2(\alpha_1) & \rho_2(\alpha_2) & \cdots & \rho_2(\alpha_{n-1}) \\ \vdots & \vdots & \vdots & \vdots & \vdots \\ \rho_{n-1}(\alpha_0) & \rho_{n-1}(\alpha_1) & \rho_{n-1}(\alpha_2) & \cdots & \rho_{n-1}(\alpha_{n-1}) \end{bmatrix}.$$

26. A The system of claim 24, wherein the Latin square matrix includes a matrix in which no two entries in each of the rows are equivalent and no two entries in each of the columns are equivalent.

27. The system of claim 26, wherein the means for determining a Latin square matrix includes:

means for providing a list of n elements in which each of the elements is a number, means for building a list of basic permutations of the list in which each of the basic permutations is a function providing a mapping of a first one of the elements to a second of the elements, the function representing flipping one of the bits in a binary representation of the first element producing the second element, the list of basic permutations generating a list of numbers whose rightmost bits form a gray code sequence, means for building a first row of the Latin square matrix using the list, and means for building successive rows of the Latin square matrix in which each of the rows of the Latin square matrix is produced using the immediately prior row of the Latin square matrix and the functions defined by the list of basic permutations.

28. The method of claim 24, wherein the multistage interconnection network includes one of a baseline network, an omega network, and an indirect binary n-cube network.

29. A method for performing all-to-all exchanges in an environment that includes a plurality of first and second nodes connected to a multistage interconnection network, comprising:

generating a square matrix that includes a plurality of entries that identify the second nodes;

preparing a message from each of the first nodes to each of the second nodes identified in the square matrix; and sending the messages from the first nodes to the second nodes via the multistage interconnection network.

30. A method for performing all-to-all exchanges in an environment that includes a plurality of first and second nodes connected to a multistage interconnection network, comprising:

generating a square matrix that includes a plurality of entries that correspond to a plurality of destination addresses;

sequentially preparing, in parallel by each of the first nodes and for each of the destination addresses, a message from the first node to one of the second nodes identified by the destination address; and sequentially sending, in parallel by each of the first nodes, the message from the first node to the destination address via the multistage interconnection network.

* * * * *